US012240226B2

(12) United States Patent
Hanaoka et al.

(10) Patent No.: US 12,240,226 B2
(45) Date of Patent: Mar. 4, 2025

(54) RECORDING DEVICE

(71) Applicant: SEIKO EPSON CORPORATION, Tokyo (JP)

(72) Inventors: Keita Hanaoka, Matsumoto (JP); Yusuke Higuchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 186 days.

(21) Appl. No.: 18/055,021

(22) Filed: Nov. 14, 2022

(65) Prior Publication Data

US 2023/0150278 A1 May 18, 2023

(30) Foreign Application Priority Data

Nov. 15, 2021 (JP) ................................ 2021-185442

(51) Int. Cl.
*B41J 11/00* (2006.01)
*B65H 29/58* (2006.01)

(52) U.S. Cl.
CPC .......... *B41J 11/0045* (2013.01); *B65H 29/58* (2013.01); *B65H 2404/1416* (2013.01)

(58) Field of Classification Search
CPC ..................... B41J 11/0045; B65H 2404/1416
See application file for complete search history.

(56) References Cited

U.S. PATENT DOCUMENTS

| | | | | | |
|---|---|---|---|---|---|
| 5,163,674 | A * | 11/1992 | Parks | B65H 29/20 271/274 |
| 6,011,948 | A | 1/2000 | Amano et al. | |
| 2008/0145128 | A1* | 6/2008 | Lee | B65H 9/004 400/630 |
| 2013/0135413 | A1* | 5/2013 | Ito | B41J 11/04 269/296 |
| 2017/0120632 | A1 | 5/2017 | Nakahata et al. | |
| 2022/0184977 | A1* | 6/2022 | Mukaida | B41J 11/04 |

FOREIGN PATENT DOCUMENTS

| | | | | |
|---|---|---|---|---|
| JP | H09-183539 | A | | 7/1997 |
| JP | 2017-088260 | A | | 5/2017 |
| JP | 2022121004 | A | * | 8/2022 |

* cited by examiner

*Primary Examiner* — Sharon Polk
(74) *Attorney, Agent, or Firm* — WORKMAN NYDEGGER

(57) ABSTRACT

A printer includes a curved path through which a medium is transported toward a line head, a transport roller pair provided in the curved path, pinching the medium by a driving roller and a driven roller at a pinching position, and transporting the medium, a gate portion having a contact surface configured to switch between a contact position located upstream of the pinching position in a transport direction in the curved path and a retreat position at which the contact surface does not contact with the medium, and a guide portion guiding a tip of the transported medium to the contact surface located at the contact position.

15 Claims, 18 Drawing Sheets

RECORDING DEVICE

The present application is based on, and claims priority from JP Application Serial Number 2021-185442, filed Nov. 15, 2021, the disclosure of which is hereby incorporated by reference herein in its entirety.

BACKGROUND

1. Technical Field

The present disclosure relates to a recording device.

2. Related Art

JP-A-9-183539 discloses an image forming apparatus including an image forming unit that forms an image on a sheet serving as an example of a medium, a transport roller pair that transports the sheet toward the image forming unit, a shutter member serving as an example of a gate portion, and a sheet transport path provided upstream of the transport roller pair, and correcting skew of the sheet by bringing a tip of the sheet to be transported into contact with the shutter member and causing the tip of the sheet to follow the shutter member. The image forming unit is an example of a recording unit that performs recording on the medium, the shutter member is an example of the gate portion, and the sheet transport path is an example of a transport path. The transport roller pair is configured to include a transport roll and a transport roller.

When a peripheral surface located upstream in a transport direction from a position where the shutter member comes into contact with the tip of the sheet, out of a peripheral surface of the transport roll and a peripheral surface of the transport roller is defined as an upstream peripheral surface, the sheet transport path disclosed in JP-A-9-183539 is opened toward an upstream peripheral surface of the transport roll and an upstream peripheral surface of the transport roller. Therefore, in the sheet transported inside the sheet transport path, in a width direction of the sheet, there is a possibility of forming a region where the tip of the sheet may come into contact with the upstream peripheral surface of the transport roll before the tip of the sheet come into contact with the shutter member, and a region where the tip of the sheet may come into contact with the upstream peripheral surface of the transport roller before the tip of the sheet comes into contact with the shutter member. In this case, there is a possibility that quality of an image formed on the sheet may be deteriorated due to a skew correction operation performed by the shutter member on the sheet.

SUMMARY

According to an aspect of the present disclosure, there is provided a recording device including a recording unit that performs recording on a medium, a transport path through which the medium is transported toward the recording unit, a transport roller pair having a first roller and a second roller which are provided in the transport path, pinching the medium by the first roller and the second roller at a pinching position, and transporting the medium toward the recording unit in a transport direction, a gate portion that has a contact surface and is configured to switch between an advance state in which the contact surface is located at a contact position located upstream of the pinching position in the transport direction in the transport path and comes into contact with a tip of the transported medium, and a retreat state in which the contact surface retreats from the contact position, and a guide portion that guides the tip of the transported medium to the contact surface located at the contact position, the guide portion protruding further in a radial direction of the first roller than does an outer periphery of the first roller when viewed in a direction along a rotary shaft of the first roller.

According to another aspect of the present disclosure, there is provided a recording device including a recording unit that performs recording on a medium, a transport path through which the medium is transported toward the recording unit, a transport roller pair having a first roller and a second roller which are provided in the transport path, pinching the medium by the first roller and the second roller at a pinching position, and transporting the medium toward the recording unit in a transport direction, and a gate portion that has a contact surface and is configured to switch between an advance state in which the contact surface is located at a contact position located upstream of the pinching position in the transport direction in the transport path and comes into contact with a tip of the transported medium, and a retreat state in which the contact surface retreats from the contact position. The transport roller pair is configured to transport the medium in a state in which a first surface recorded by the recording unit comes into contact with the first roller. The first roller is a toothed roller having a plurality of teeth configured to come into point contact with the medium, and the plurality of teeth form a peripheral surface around an axis center of a rotary shaft of the first roller.

DESCRIPTION OF EXEMPLARY EMBODIMENTS

Figure 1:
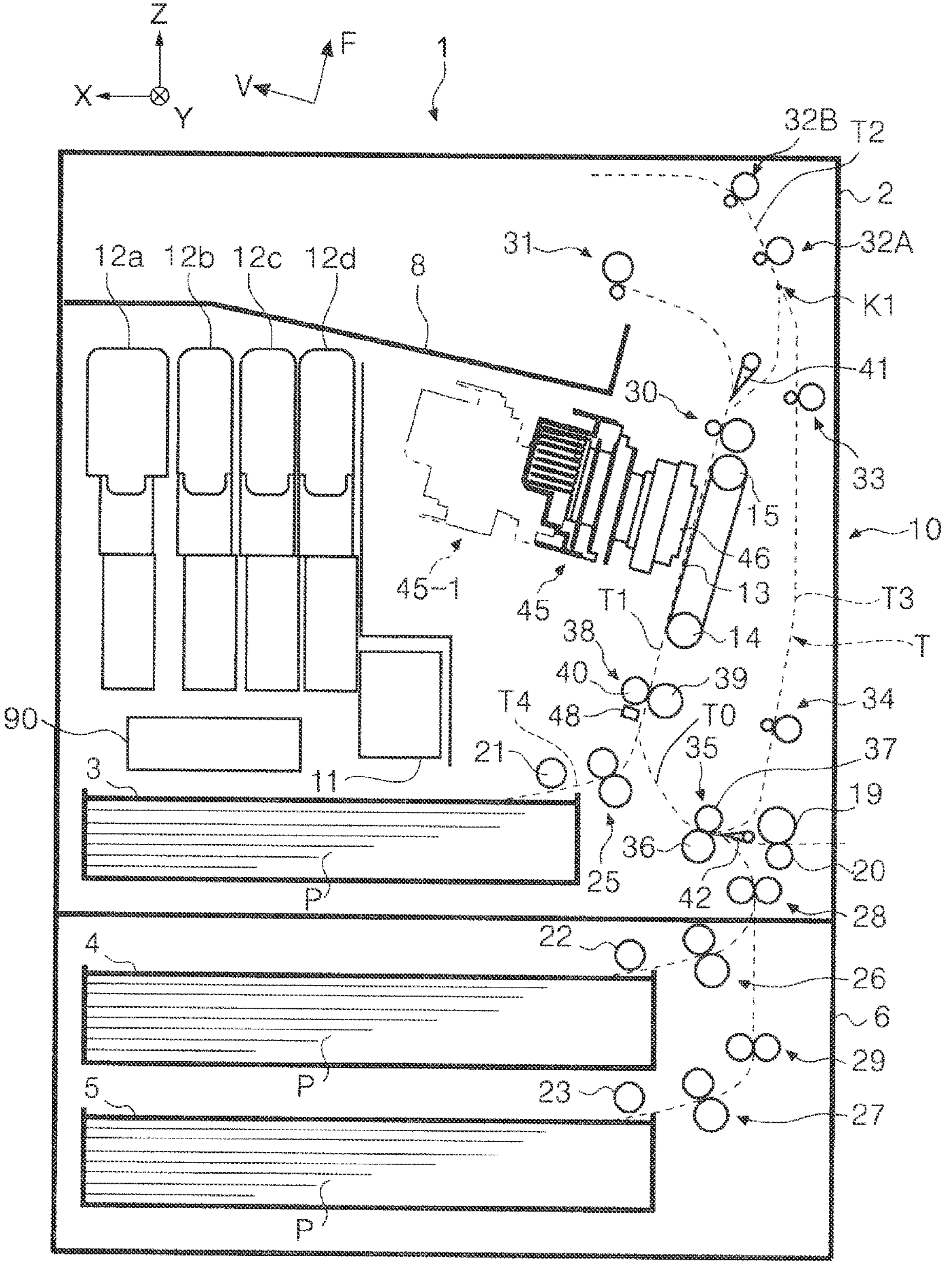
FIG. 1 is a view illustrating a whole transport path of a printer.

Hereinafter, the present disclosure will be described with reference to embodiments. In each drawing, the same reference numerals will be assigned to the same members, and repeated description will be omitted. In the present specification, description of "same" or "equal" indicates that members are completely the same. Moreover, the description includes when the members are the same in view of measurement errors, when the members are the same in view of manufacturing variations in the members, and when the members are the same within a range where functions of the members are not impaired. Therefore, for example, description of "dimensions of both members are the same" indicates that a dimension difference between the two members is within ±10%, more preferably within ±5%, and particularly preferably within ±3% of one dimension in view of the measurement errors and the manufacturing variations in the members.

In addition, in each drawing, X, Y, and Z represent three spatial axes orthogonal to each other. In the present specification, directions along the axes will be referred to as an X-axis direction, a Y-axis direction, and a Z-axis direction. The present specification will be described as follows. When the directions are specified, a positive direction is set as "+", and a negative direction is set as "−". Positive and negative signs are used together with direction notation. A direction in which an arrow in each drawing faces will be referred to as a positive (+) direction, and a direction opposite to the arrow will be referred to as a negative (−) direction.

In addition, the Z-axis direction indicates a direction of gravity. In addition, description will be made in such a manner that a plane including an X-axis and a Y-axis is set as an X-Y plane, a plane including the X-axis and a Z-axis is set as an X-Z plane, and a plane including the Y-axis and the Z-axis is set as a Y-Z plane. In addition, the X-Y plane is a horizontal plane. Furthermore, description will be made in such a manner that the three spatial axes X, Y, and Z which do not limit the positive direction and the negative direction are set as the X-axis, the Y-axis, and the Z-axis.

1. Embodiment 1

In the present embodiment, a printer 1 is configured to function as an ink jet printer, and performs recording on a medium P represented by a recording sheet by ejecting an ink serving as an example of a liquid. The printer 1 is an example of a recording device. In addition, a configuration in which a line head 46, which is described later, is omitted from the printer 1 can be referred to as a medium transport device 10. However, even when the line head 46 is provided, the printer 1 can be regarded as the medium transport device 10 in view of transporting the medium P.

In each drawing, the Y-axis direction is a direction intersecting a transport direction of the medium P, that is, a medium width direction, and is also a device depth direction. In the Y-axis directions, a +Y-direction is a direction from a device front surface to a device back surface, and a −Y-direction is a direction from the device back surface to the device front surface. The X-axis direction is the device width direction. When viewed from an operator facing the printer 1, a +X-direction represents leftward, and a −X-direction represents rightward. The Z-axis direction is a device height direction. A+Z-direction represents an upward direction, and a −Z-direction represents a downward direction.

Hereinafter, a direction in which the medium P is transported may be referred to as "downstream", and a direction opposite thereto may be referred to as "upstream" in some cases. In addition, in FIG. 1, a transport path T is illustrated by a broken line. In the printer 1, the medium P is transported through the transport path T indicated by the broken line.

In addition, an F-axis direction is the transport direction of the medium in a recording region which is between the line head 46 and a transport belt 13. A+F-direction represents downstream in the transport direction, and a −F-direction opposite thereto is upstream in the transport direction. In addition, a V-axis direction is a moving direction of a head unit 45. A+V-direction in the V-axis direction represents a direction in which the head unit 45 moves away from the transport belt 13, and a −V-direction represents a direction in which the head unit 45 moves close to the transport belt 13.

As illustrated in FIG. 1, the printer 1 includes a first medium cassette 3 in which the medium P is accommodated in a lower portion of a device main body 2, and is configured so that an extra unit 6 can be coupled to a lower side of the device main body 2. When the extra unit 6 is coupled, a second medium cassette 4 and a third medium cassette 5 are located below the first medium cassette 3. The medium P fed from each of the medium cassettes is transported inside the printer 1 along the transport path T indicated by the broken line. The first medium cassette 3, the second medium cassette 4, and the third medium cassette 5 are examples of a medium accommodation unit.

The first medium cassette 3, the second medium cassette 4, and the third medium cassette 5 are provided with pick rollers 21, 22, and 23 which feed the accommodated medium P in the −X-direction.

In addition, delivery roller pairs 25, 26, and 27 deliver the medium P fed in the −X-direction in an obliquely upward direction. The delivery roller pairs 25, 26, and 27 are respectively provided for the first medium cassette 3, the second medium cassette 4, and the third medium cassette 5. Hereinafter, unless otherwise described, a "roller pair" is configured to include a driving roller driven by a motor (not illustrated) and a driven roller rotated by coming into contact with the driving roller.

The medium P fed from the third medium cassette 5 is transported to a transport roller pair 35 by transport roller pairs 29 and 28. In addition, the medium fed from the second medium cassette 4 is transported to the transport roller pair 35 by the transport roller pair 28. The medium is transported to the transport roller pair 38 by the transport roller pair 35. Hereinafter, a section of the transport path T from the transport roller pair 35 to the transport roller pair 38 will be referred to as a curved path TO. The curved path TO forms a portion of the transport path T. In addition, the curved path T0 is an example of the transport path. The curved path T0 is a section in which the medium P is curved to protrude in the −Z-direction.

The transport roller pair 35 is configured to include a driving roller 36 driven by a motor (not illustrated) and a driven roller 37 which can be driven and rotated. In addition, the transport roller pair 38 is configured to include a driving roller 39 driven by a motor (not illustrated), and a driven roller 40 which can be driven and rotated.

The medium P fed from the first medium cassette 3 is transported to the transport roller pair 38 without passing through the transport roller pair 35. In addition, a supply roller 19 and a separation roller 20 which are provided in the vicinity of the transport roller pair 35 are a roller pair that feeds the medium P from a supply tray (not illustrated).

The medium P that receives a feeding force from the transport roller pair 38 is transported to a portion between the line head 46 and the transport belt 13, that is, to a recording position facing the line head 46. The line head 46 is an example of a recording unit. Hereinafter, a section of the transport path T from the transport roller pair 38 to the transport roller pair 30 will be referred to as a recording-time transport path T1. The recording-time transport path T1 forms a portion of the transport path T.

The line head 46 forms the head unit 45. The line head 46 ejects an ink onto a surface of the medium P to perform recording. The line head 46 is an ink ejecting head configured so that a nozzle for ejecting the ink covers an entire region in the medium width direction, and is configured to function as an ink ejecting head which can perform recording over an entire region in the medium width without moving in the medium width direction. However, without being limited thereto, the ink ejecting head may be a type mounted on a carriage to eject the ink while moving in the medium width direction.

The head unit 45 is provided to be capable of advancing and retreating with respect to the recording-time transport path T1, and is provided so that the head unit 45 can be displaced between a recording position illustrated by a solid line in FIG. 1 and a retreat position retreated most from the transport belt 13 as illustrated by a two-dot chain line and a reference numeral 45-1 in FIG. 1. When the head unit 45 is located at the retreat position, maintenance of the line head 46 is performed by a maintenance unit (not illustrated). In the present embodiment, a displacement direction of the head unit 45 is the V-axis direction, which is a direction along inclination of a discharge tray 8. The head unit 45 is located on a lower side of the discharge tray 8 and upstream in a direction in which the medium P is discharged to the discharge tray 8, and is displaced along a lower surface of the discharge tray 8.

Ink accommodation units 12*a*, 12*b*, 12*c*, and 12*d* accommodate the ink. The inks ejected from the line head 46 are supplied from the ink accommodation units 12*a*, 12*b*, 12*c*, and 12*d* to the line head 46 via tubes (not illustrated). The ink accommodation units 12*a*, 12*b*, 12*c*, and 12*d* are provided to be attachable and detachable. In addition, a waste liquid accommodation unit 11 stores the ink serving as waste liquid ejected from the line head 46 toward a flushing cap (not illustrated) for maintenance.

The transport belt 13 is an endless belt hung around a pulley 14 and a pulley 15, and rotates in such a manner that at least one of the pulley 14 and the pulley 15 is driven by a motor (not illustrated). The medium P is transported to a position facing the line head 46 while being suctioned to a belt surface of the transport belt 13. When the medium P is suctioned to the transport belt 13, a suction method such as an air suction method and an electrostatic suction method can be adopted.

Here, the recording-time transport path T1 passing through the position facing the line head 46 forms an angle with respect to a horizontal direction and a vertical direction, and is configured to transport the medium P in an upward direction. The upward transport direction is a direction including an −X-direction component and a +Z-direction component in FIG. 1. According to this configuration, it is possible to suppress dimensions of the printer 1 in the horizontal direction. In the present embodiment, the recording-time transport path T1 is set to an inclination angle in a range of 65° to 85° with respect to the horizontal direction, and is more specifically set to an inclination angle of approximately 75°.

The medium P recorded on a first surface by the line head 46 is further transported in the upward direction by the transport roller pair 30 located downstream of the transport belt 13. A flap 41 is provided downstream of the transport roller pair 30, and the transport directions of the medium P are switched by the flap 41. When the medium P is discharged as it is, the transport path T of the medium P is switched to face the upper transport roller pair 31 by the flap 41, and the medium P is discharged toward the discharge tray 8 by the transport roller pair 31.

When recording is further performed on a second surface in addition to the first surface of the medium P, the transport direction of the medium P is directed to a branch position K1 by the flap 41. The medium P passes through the branch position K1, and enters a switchback path T2. In the present embodiment, the switchback path T2 is a section of the upper transport path T from the branch position K1. The switchback path T2 is provided with transport roller pairs 32A and 32B. The medium P entering the switchback path T2 is transported in the upward direction by the transport roller pairs 32A and 32B. When a lower edge of the medium P passes through the branch position K1, rotation directions of the transport roller pairs 32A and 32B are switched. In this manner, the medium P is transported in a downward direction.

An inversion path T3 is coupled to the switchback path T2. In the present embodiment, the inversion path T3 is a path section from the branch position K1 to the transport roller pair 35 through the transport roller pairs 33 and 34. The inversion path T3 is coupled to the curved path TO. In this manner, the medium P transported in the downward direction from the branch position K1 receives a feeding force from the transport roller pairs 33 and 34, reaches the transport roller pair 35, and is transported toward the transport roller pair 38 by the transport roller pair 35.

Due to the inversion path T3 and the curved path T0, a surface of the medium P configured to face downward, that is, the second surface which is a surface opposite to the first surface serving as a recorded surface is configured to face upward. In other words, when the recording is further performed on the second surface in addition to the first surface of the medium P, in the curved path T0, the medium P whose first surface is recorded by the line head 46 is transported toward the line head 46 in a direction in which the first surface comes into contact with a peripheral surface 39*d* of the driving roller 39 (to be described later) of the transport roller pair 38. The second surface of the medium P transported to the position facing the line head 46 through the inversion path T3 faces the line head 46. In this manner, the recording can be performed on the second surface of the medium P by the line head 46.

The flap 42 is provided to be rotatable around a rotary shaft. The flap 42 usually adopts a posture which can guide the medium P moving forward to the inversion path T3 to the transport roller pair 35. In contrast, the medium P transported from the second medium cassette 4 or the third medium cassette 5 below the transport roller pair 35 reaches the transport roller pair 35 by pushing up the flap 42.

In addition, a delivery path T4 is coupled to the curved path TO. In the present embodiment, the delivery path T4 is a path section from the first medium cassette 3 to the curved path TO through the delivery roller pair 25. The medium P is transported via the delivery path T4, from the first medium cassette 3 toward the curved path TO. The medium P fed from the first medium cassette 3 passes through a path located downstream in the transport direction from a coupling position between the delivery path T4 and the curved path T0 in the delivery path T4 and the curved path T0, and reaches the transport roller pair 38. The medium P reaching the transport roller pair 38 is transported by the transport roller pair 38 toward the recording-time transport path T1 located downstream in the transport direction. The transport roller pair 38 is an example of a transport unit.

Figure 2:
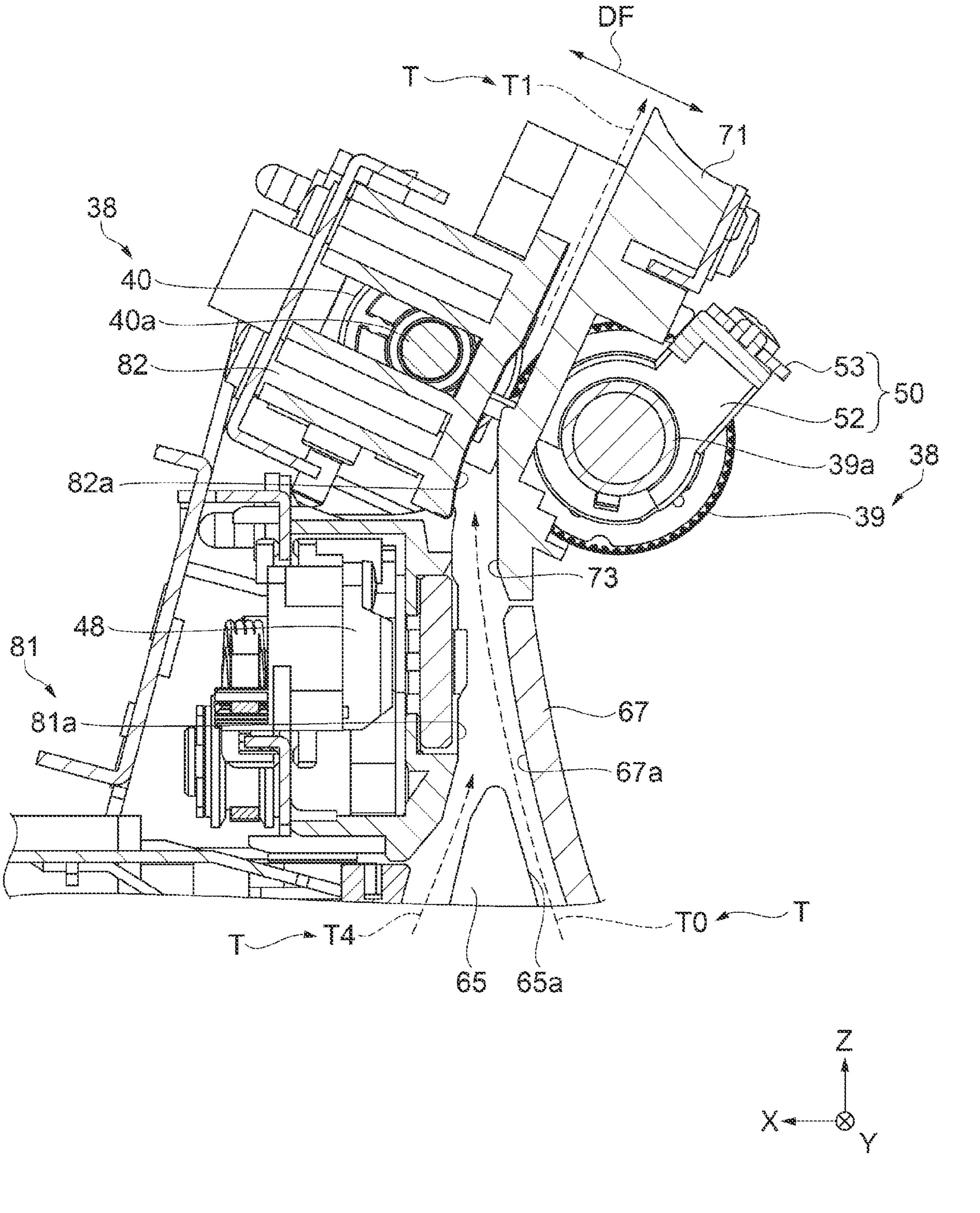
FIG. 2 is a view when a main portion of a curved path is viewed from a front surface side of the printer.

Next, a configuration of the curved path T0 will be described. As illustrated in FIG. 2, the inner side of the curved path T0 is formed by an inner path forming portion 67 and a first guide portion 71, and the outer side of the curved path T0 is formed by an outer path forming portion 65, an intermediate guide portion 81, and a second guide portion 82. The inner path forming portion 67 forms an inner path forming surface 67*a* which is an inner surface of the curved path T0. The outer path forming portion 65 forms an outer path forming surface 65*a* which is an outer surface of the curved path T0.

The first guide portion 71 is continuously provided downstream of the inner path forming portion 67 in the transport direction. The first guide portion 71 forms the inner surface of the curved path T0 from the inner path forming surface 67*a* of the inner path forming portion 67 toward the transport roller pair 38 in the transport direction, and a portion of the recording-time transport path T1 located downstream of the transport roller pair 38 in the transport direction. The first guide portion 71 is provided with a driving roller 39 forming the transport roller pair 38 and a gate portion 50. The first guide portion 71 has at least one rib 73. The rib 73 supports the medium P by coming into contact with the transported medium P.

When a direction intersecting the transport direction and the Y-axis direction is defined as a depth direction DF of the transport path T including the curved path T0 and the recording-time transport path T1, an axis center of a rotary shaft 39*a* of the driving roller 39 is provided at a position farther separated from the transport path T than the inner surface of the transport path T formed by the rib 73 of the first guide portion 71, at a side of the first guide portion 71 with respect to the transport path T in the depth direction DF of the transport path T. In other words, the rotary shaft 39*a* of the driving roller 39 is provided at a position farther separated from the curved path T0 than the rib 73 of the first guide portion is, at the side of the first guide portion 71 with respect to the curved path T0 in the depth direction DF of the transport path T.

The intermediate guide portion 81 is provided downstream of the outer path forming portion 65 in the transport direction. The intermediate guide portion 81 has a guide surface 81*a*. The guide surface 81*a* forms an outer surface of the curved path T0 from the outer path forming surface 65*a* of the outer path forming portion 65 toward the second guide portion 82 in the transport direction. The intermediate guide portion 81 is provided with a medium detection unit 48. The delivery path T4 coupled to the curved path T0 is formed between the intermediate guide portion 81 and the outer path forming portion 65.

The second guide portion 82 is continuously provided downstream of the intermediate guide portion 81 in the transport direction. The second guide portion 82 has a guide surface 82*a*. The guide surface 82*a* forms an outer surface of the curved path T0 from the guide surface 81*a* of the intermediate guide portion 81 toward the transport roller pair 38 in the transport direction. In addition, the second guide portion 82 forms a portion of the recording-time transport path T1 located downstream of the transport roller pair 38 in the transport direction. The second guide portion 82 is provided with the driven roller 40 forming the transport roller pair 38.

An axis center of a rotary shaft 40*a* of the driven roller 40 is provided at a position farther separated from the curved path T0 than the guide surface 82*a* of the second guide portion is, at a side of the second guide portion 82 with respect to the curved path T0 in the depth direction DF of the transport path T.

As illustrated in FIGS. 3 to 6, 13, and 14, a plurality of the driving rollers 39 forming the transport roller pair 38 provided in the curved path T0 are provided at a predetermined interval along the Y-axis direction which is the axial direction of the rotary shaft 39*a*, that is, along the medium width direction. A reference numeral CL indicates a center position in the width direction of the transport path T, and the driving rollers 39 are disposed to have a bilaterally symmetrical structure with respect to the center position CL. In the present embodiment, four driving rollers 39 are respectively disposed on the left side and the right side of the center position CL. The driving roller 39 is an example of a first roller.

Figure 3:
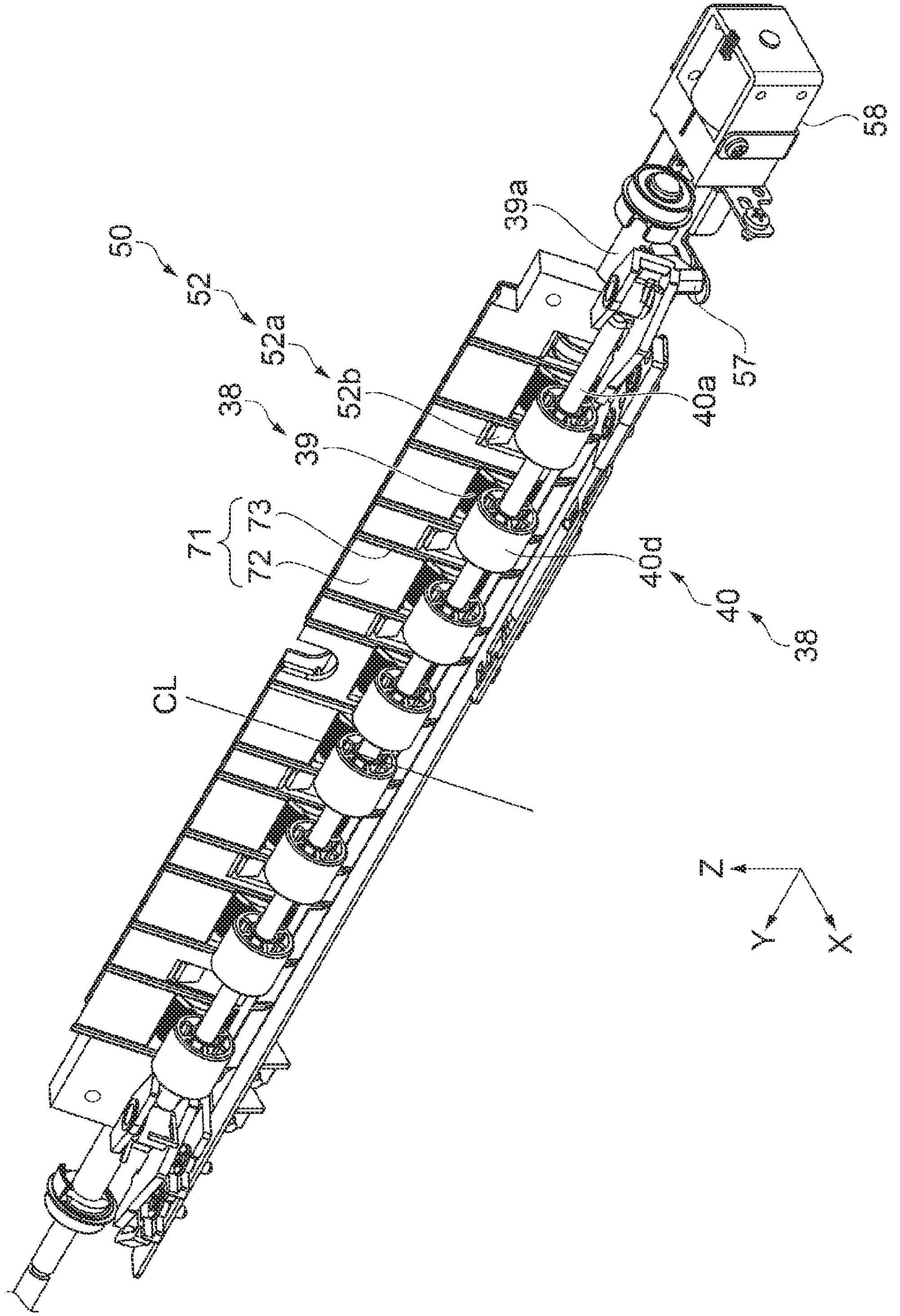
FIG. 3 is a perspective view illustrating a main portion of the curved path.
Figure 4:
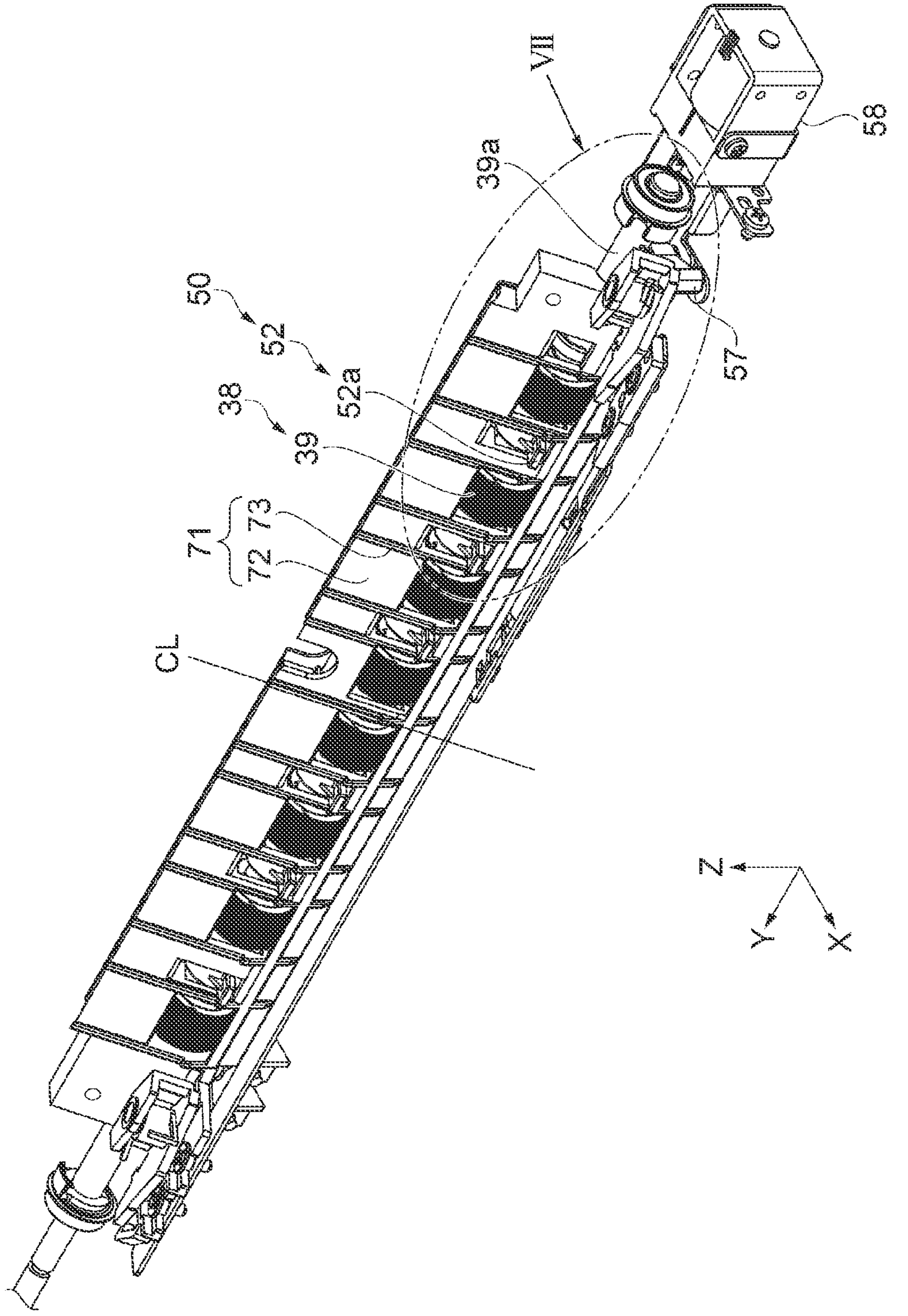
FIG. 4 is a perspective view illustrating a main portion of the curved path in a state where a driven roller is removed from FIG. 3.
Figure 5:
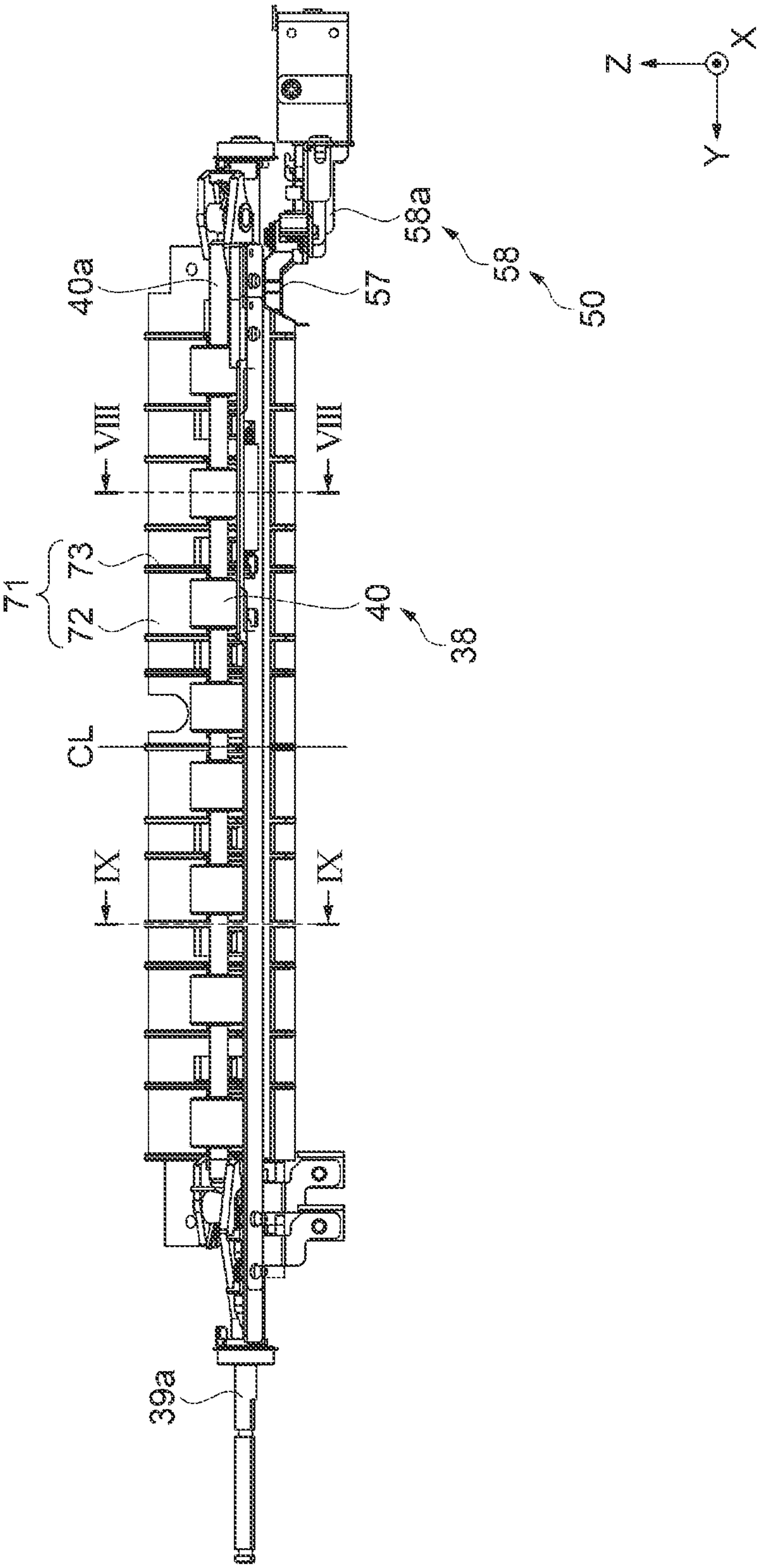
FIG. 5 is a view when the main portion of the curved path is viewed from a left side of the printer.
Figure 6:
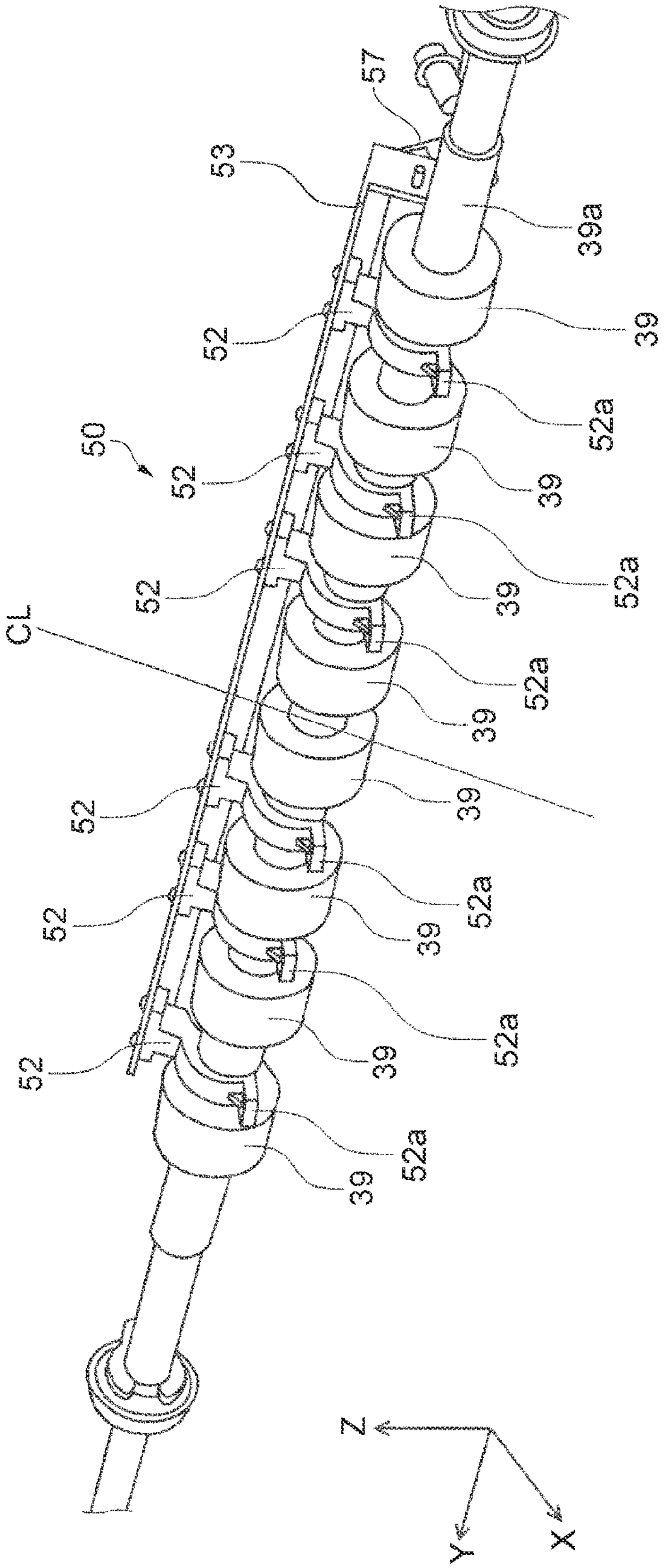
FIG. 6 is a perspective view of a driving roller and a gate portion.

As illustrated in FIGS. 3 and 5, a plurality of the driven rollers 40 forming the transport roller pair 38 are provided to face the driving rollers 39 at a predetermined interval along the axial direction of the rotary shaft 40*a*, that is, along the medium width direction. Therefore, the transport roller pair 38 is provided in the curved path T0 so that the medium P is pinched by the driving roller 39 and the driven roller 40 and the medium P can be transported toward the line head 46. The driven rollers 40 are disposed to have a bilaterally symmetrical structure with respect to the center position CL. In the present embodiment, four driven rollers 40 are respectively disposed on the left side and the right side of the center position CL. A peripheral surface 40*d* of the driven roller 40 in the present embodiment is formed of an elastic member. The driven roller 40 is an example of a second roller.

Figure 7:
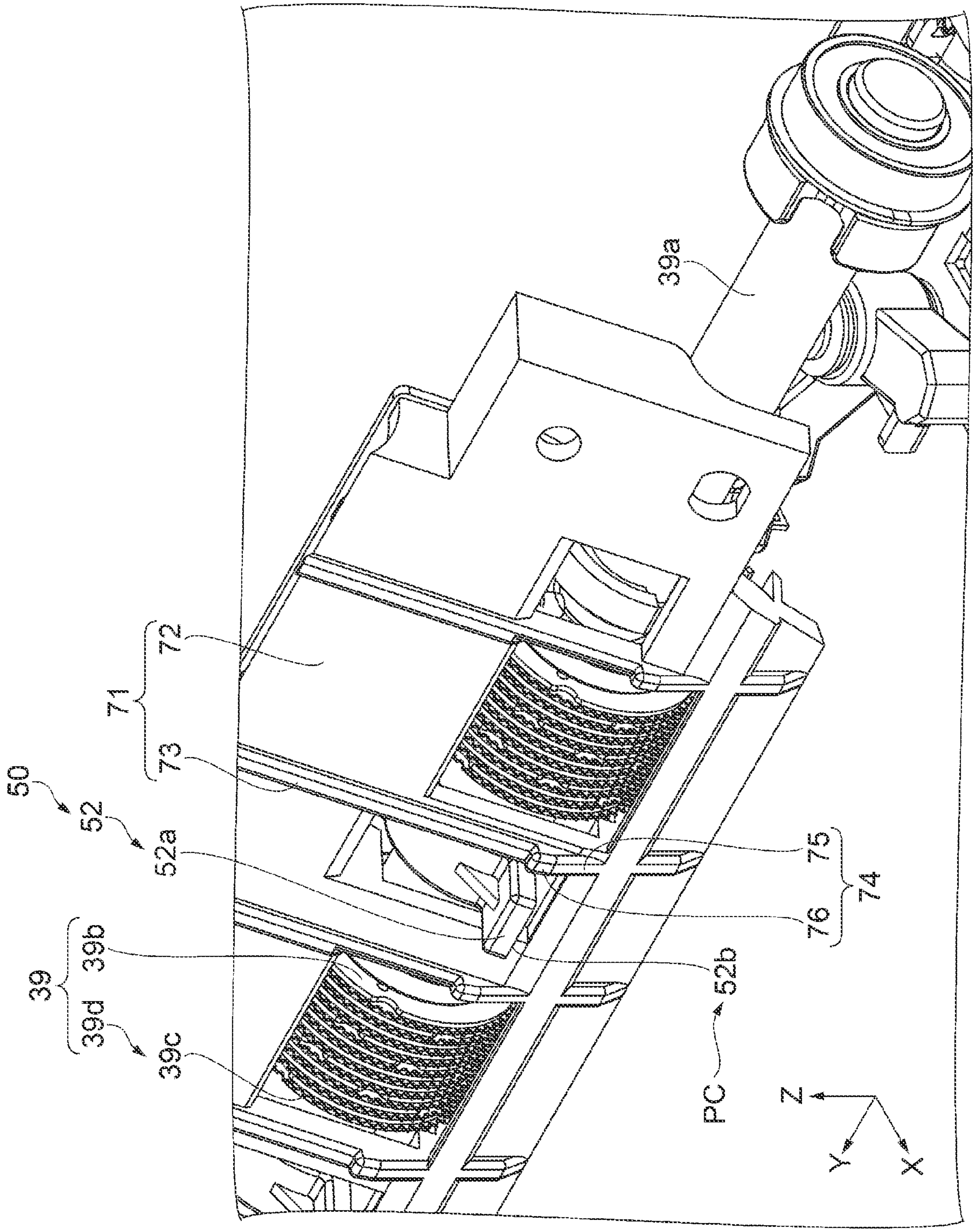
FIG. 7 is a partially enlarged perspective view illustrating a main portion illustrated in FIG. 4.
Figure 8:
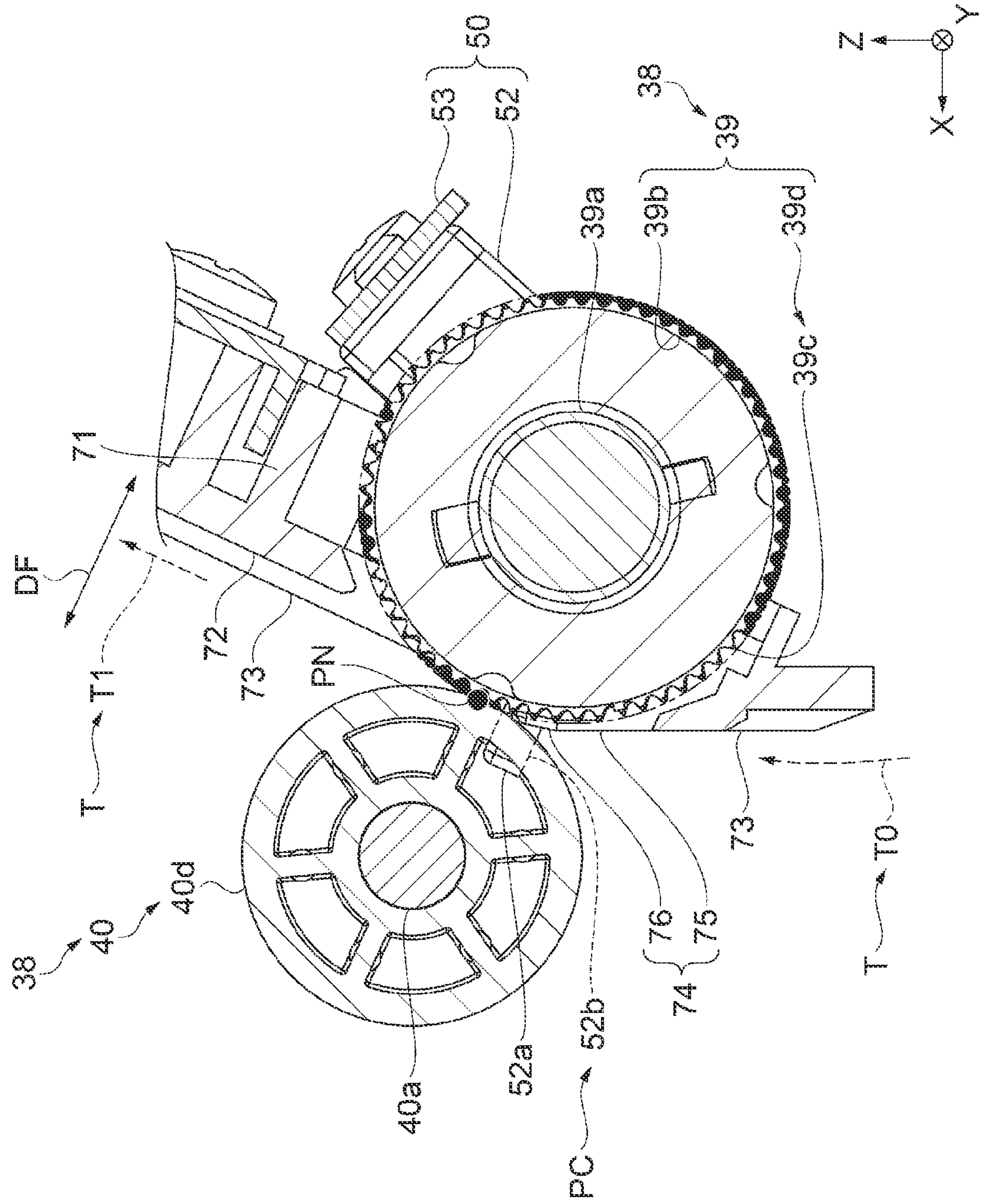
FIG. 8 is a sectional view illustrating a cross section VIII-VIII illustrated in FIG. 5.

As illustrated in FIGS. 7 and 8, the driving roller 39 includes a plurality of teeth 39*c* protruding outward from a cylindrical portion 39*b* of the driving roller 39. The driving roller 39 is an example of a toothed roller. A plurality of the teeth 39*c* provided in the cylindrical portion 39*b* of the driving roller 39 are provided to form a row along a rotation direction of the driving roller 39 rotating together with the rotary shaft 39*a*, that is, along a circumferential direction of the driving roller 39, and are aligned in a plurality of rows in the Y-axis direction. The teeth 39*c* provided in the cylindrical portion 39*b* of the driving roller 39 are disposed so that an interval between the tooth 39*c* and the tooth 39*c* in the circumferential direction of the driving roller 39 when viewed in a direction along the Y-axis direction is an equal interval.

The driving roller 39 transports the medium P in such a manner that the tips of the teeth 39*c* provided in the cylindrical portion 39*b* come into contact with the medium P. The plurality of teeth 39*c* included in the driving roller 39 can come into point contact with the medium P. As illustrated by a two-dot chain line in FIG. 8, the tips of the plurality of teeth 39*c* which can come into point contact with the medium P form the peripheral surface 39*d* of the driving roller 39 which can come into contact with the medium P. In other words, the driving roller 39 has the plurality of teeth 39*c* which can come into point contact with the medium P, and the plurality of teeth 39*c* are toothed rollers forming the peripheral surface 39*d* around the axis center of the rotary shaft 39*a* of the driving roller 39. The peripheral surface 39*d* of the driving roller 39 can also be referred to as an outer periphery of the driving roller 39.

When the tip of the tooth 39*c* included in the driving roller 39 is a protruding portion that can come into contact with the medium P on the peripheral surface 39*d* of the driving roller 39, a valley portion between the tip of the tooth 39*c* and the tip of the tooth 39*c* which are included in the driving roller 39 is a recess portion that does not come into contact with the medium P. Therefore, the peripheral surface 39*d* of the driving roller 39 is more uneven than the peripheral surface 40*d* of the driven roller 40. Therefore, a numerical value of surface roughness of the peripheral surface 39*d* is greater than a numerical value of surface roughness of the peripheral surface 40*d*.

As illustrated in FIG. 2, the curved path T0 is provided with the gate portion 50. The gate portion 50 includes a moving member 52. The moving member 52 is provided to be rotatable with respect to the rotary shaft 39*a* of the driving roller 39. In other words, the gate portion 50 is provided to be rotatable with respect to the rotary shaft 39*a* of the driving roller 39.

As illustrated in FIGS. 3 to 6, a plurality of the moving members 52 are provided at a predetermined interval in the Y-axis direction. The moving members 52 are disposed to have a bilaterally symmetrical structure with respect to the center position CL. In the present embodiment, three moving members 52 are respectively disposed on the left side and the right side of the center position CL. The plurality of moving members 52 are attached to a coupling member 53 which can rotate coaxially with the rotary shaft 39*a*, and all of the moving members 52 are rotated at the same time in accordance with the rotation of the coupling member 53. A switching unit 57 is coupled to an end portion of the coupling member 53 in the −Y-direction.

The switching unit 57 couples the coupling member 53 and a plunger 58*a* of a solenoid 58. The switching unit 57 converts a linear movement of the plunger 58*a* in the Y-axis direction which is generated by supplying power to the solenoid 58 into a rotational operation of the coupling member 53 around the axis center of the rotary shaft 39*a*. When the plunger 58*a* moves in the −Y-direction by driving the solenoid 58, the coupling member 53 rotates around the axis center of the rotary shaft 39*a* in a clockwise direction when viewed in the +Y-direction from a side in the −Y-direction. In this manner, the moving member 52 rotates around the axis center of the rotary shaft 39*a* in the clockwise direction when viewed in the +Y-direction from the side in the −Y-direction.

A pressing force rotating in a counterclockwise direction acts on the coupling member 53 by a spring (not illustrated). Therefore, when the plunger 58*a* moves in the +Y-direction by stopping power supply to the solenoid 58, the coupling member 53 rotates around the axis center of the rotary shaft 39*a* in the counterclockwise direction when viewed in the +Y-direction from the side in the −Y-direction. In this manner, the moving member 52 rotates around the axis center of the rotary shaft 39*a* in the counterclockwise direction when viewed in the +Y-direction from the side in the −Y-direction, and the gate portion 50 is in an advance state (to be described later).

A control unit 90 for controlling the solenoid 58 controls an operation of the solenoid 58, that is, an advancing/retreating operation of a contact portion 52*a* with respect to the curved path T0, based on a detection signal of the medium detection unit 48 provided in the intermediate guide portion 81 near the upstream portion of the transport roller pair 38. In addition to controlling the solenoid 58, the control unit 90 performs various types of the control such as transporting the medium P in the printer 1, a skew correction operation, and recording.

Figure 10:
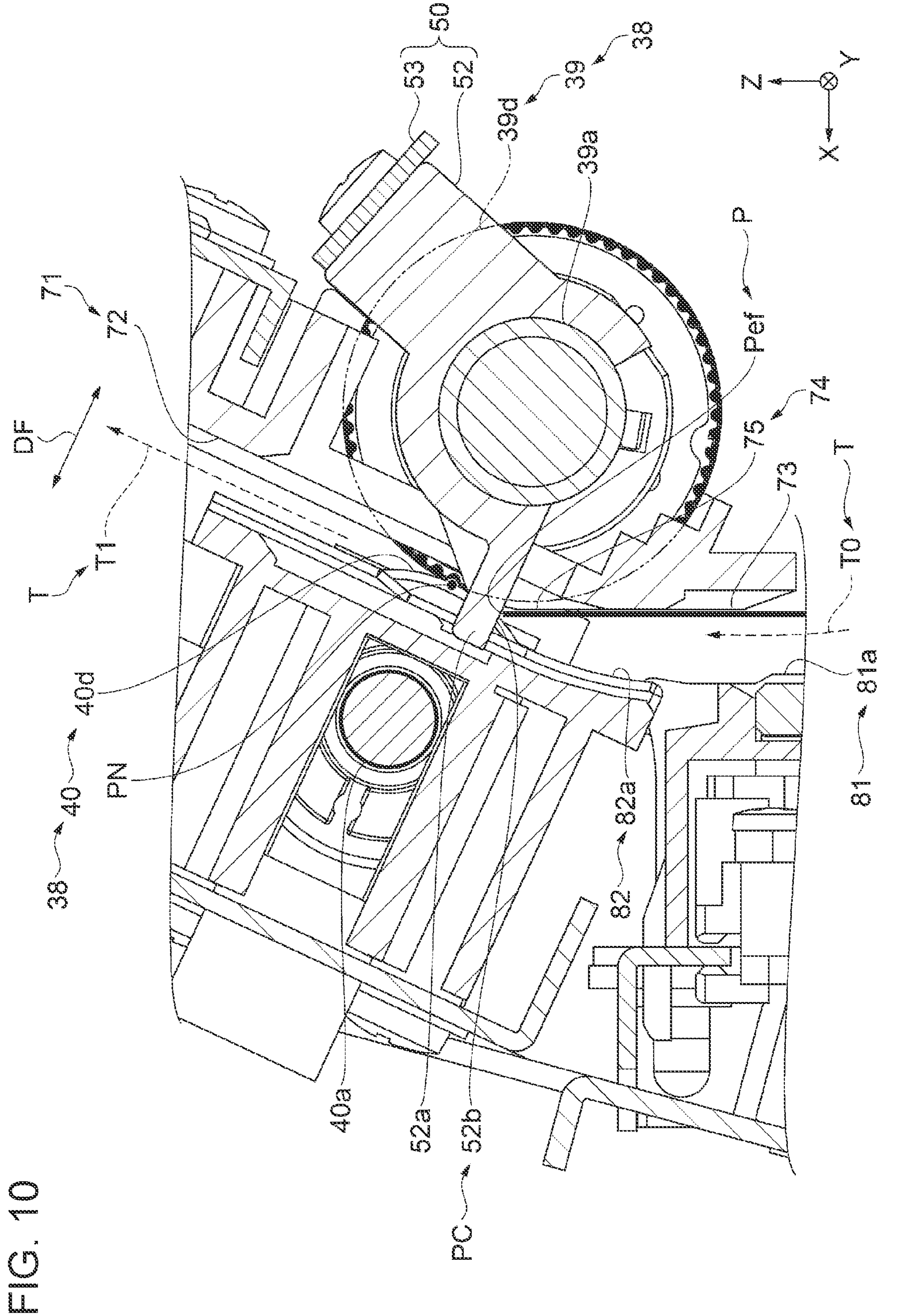
FIG. 10 is a sectional view illustrating the main portion of the curved path in which the gate portion is in an advance state.
Figure 11:
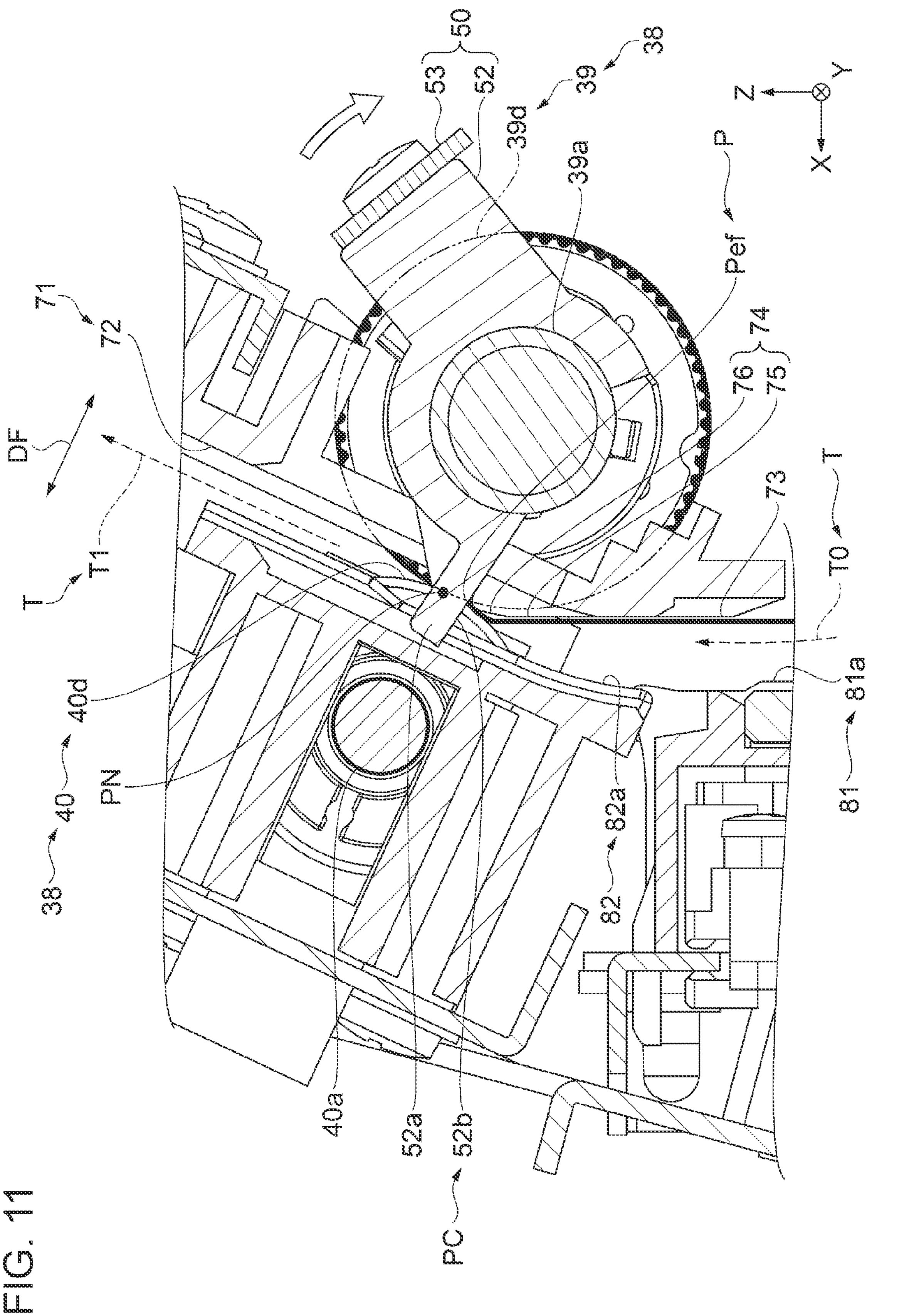
FIG. 11 is a sectional view illustrating the main portion of the curved path in which the gate portion is in a switching process from the advance state to a retreat state.
Figure 12:
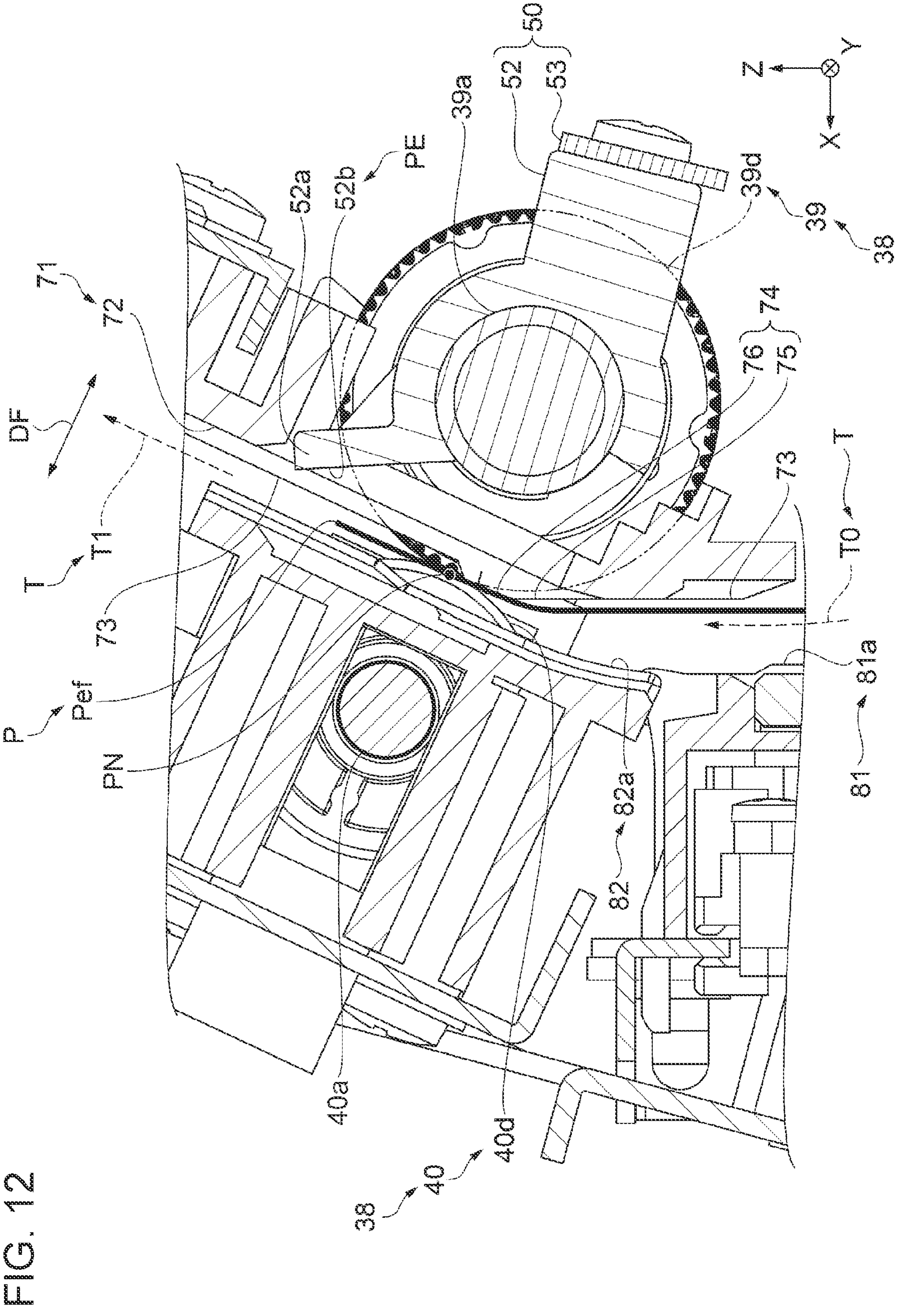
FIG. 12 is a sectional view illustrating the main portion of the curved path in which the gate portion is in the retreat state.

As illustrated in FIGS. 3, 4, and 6 to 14, the contact portion 52*a* is formed in the moving member 52. The gate portion 50 rotates the moving member 52 to switch between an advance state where the contact portion 52*a* advances to the curved path T0 as illustrated in FIGS. 2, 4, 7 to 10, 13, and 14, and a retreat state where the contact portion 52*a* retreats from the curved path T0 as illustrated in FIGS. 3 and 12. The contact portion 52*a* is provided with a contact surface 52*b* with which a tip Pef of the medium P can come into contact. The contact surface 52*b* is a surface upstream of the contact portion 52*a* in the transport direction. When the gate portion 50 is in the advance state, the tip Pef of the medium P comes into contact with the contact surface 52*b*.

Figure 9:
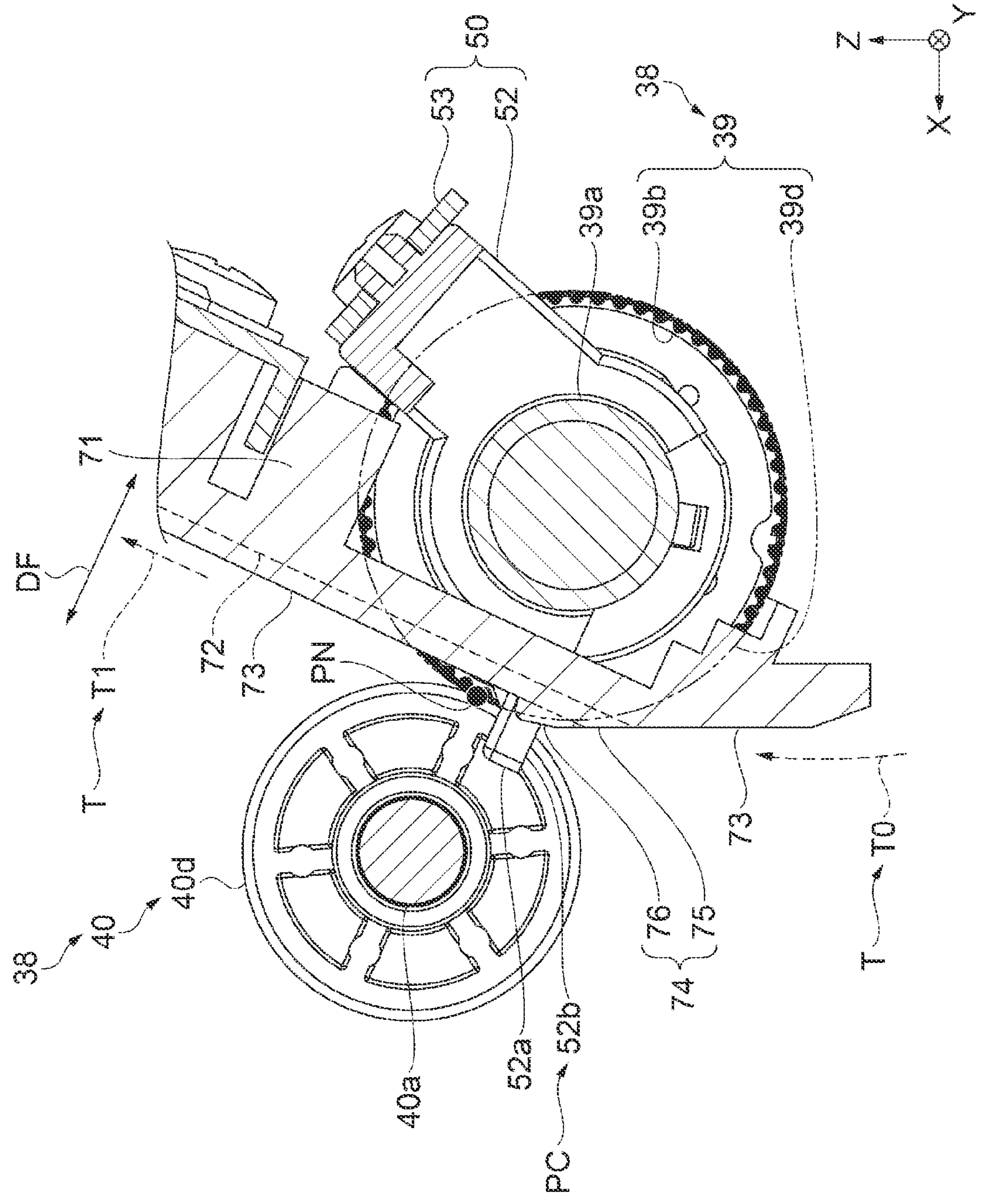
FIG. 9 is a sectional view illustrating a cross section IX-IX illustrated in FIG. 5.

As illustrated in FIGS. 8 to 10, a position of the contact surface 52*b* when the gate portion 50 is in the advance state is defined as a contact position PC, and as illustrated in FIG. 12, a position of the contact surface 52*b* when the contact surface 52*b* retreats from the contact position PC and the gate portion 50 is in the retreat state is defined as a retreat position PE. When a position where the transport roller pair 38 pinches the medium P is defined as a pinching position PN, as illustrated in FIGS. 8 to 10, the contact position PC is located upstream in the transport direction from the pinching position PN. In addition, the contact position PC is located downstream, in the transport direction, from an end upstream of the peripheral surface 39*d* of the driving roller 39 and the peripheral surface 40*d* of the driven roller 40.

As illustrated in FIG. 12, the retreat position PE is located downstream in the transport direction from the pinching position PN. In addition, when the gate portion 50 is in the retreat state, the gate portion 50 is located at a position farther separated from the curved path T0 than the rib 73 of the first guide portion 71 is. In addition, the contact portion 52*a* of the moving member 52 in the gate portion 50 in the retreat state is located at a position farther separated from the curved path T0 than the rib 73 of the first guide portion is, on the first guide portion 71 side with respect to the curved path T0 in the depth direction DF of the transport path T.

As illustrated in FIG. 10, in a state where the tip Pef of the medium P is in contact with the contact surface 52*b* of the contact portion 52*a*, that is, the gate portion 50, the medium is transported by the transport roller pair 35 located upstream in the transport direction of the transport roller pair 38. In this manner, the medium P bulges in the curved path T0. In this manner, the tip Pef of the medium P follows the gate portion 50, and the skew is corrected. In this way, the medium P is transported toward the transport roller pair 38 by the transport roller pair 35, and the tip Pef of the medium P is brought into contact with the contact surface 52*b* at the contact position PC. Furthermore, in this state, an operation of the transport roller pair 35 to transport the medium P is performed as a skew correction operation.

As illustrated in FIGS. 3 to 5 and 7 to 12, the first guide portion 71 has a base surface 72, a rib 73 protruding from the base surface 72 toward the second guide portion 82, and a guide portion 74. The rib 73 supports the medium P by coming into contact with the transported medium P.

The rib 73 is provided to extend from the upstream portion of the driving roller 39 in the transport direction to the downstream portion of the driving roller 39 in the transport direction. A plurality of the ribs 73 are provided to sandwich the driving roller 39 in the Y-axis direction. In particular, the driving roller 39 is interposed between two ribs 73, which are located on either side of the driving roller 39 in the Y-axis direction. In each of the ribs 73, the guide portion 74 that guides the tip Pef of the transported medium P toward the driven roller 40 is provided to protrude from the tip of the rib 73 as illustrated in FIG. 9. In other words, the guide portion 74 is provided at a position corresponding to the rib 73. In addition, the guide portion 74 is provided at the same position as the rib 73 in the Y-axis direction.

Since the guide portion 74 comes into contact with the medium P, the guide portion 74 guides the tip Pef of the transported medium P toward the driven roller 40. The guide portion 74 of the present embodiment is integrally formed with the rib 73. Therefore, a plurality of the guide portions 74 are provided to sandwich the driving roller 39 in the Y-axis direction. In particular, the driving roller 39 is interposed between two guide portions 74, which are located on either side of the driving roller 39 in the Y-axis direction. As illustrated in FIG. 9, when viewed in a direction along the Y-axis direction, the guide portion 74 protrudes further in the radial direction of the driving roller 39 than does the peripheral surface 39*d* of the driving roller 39. The Y-axis direction is an example of a direction of rotary shaft 39*a* of the driving roller 39.

A surface of the guide portion 74 in contact with the medium P is smoothly formed, and the surface is less uneven than the peripheral surface 39*d* of the driving roller 39. Therefore, a numerical value of surface roughness of the surface of the guide portion 74 is smaller than a numerical value of surface roughness of the peripheral surface 39*d* of the driving roller 39. In addition, the surface of the guide portion 74 may be formed to be the same as or smoother than the peripheral surface 40*d* of the driven roller 40. In this case, the unevenness of the surface of the guide portion 74 is the same as or smaller than the unevenness of the peripheral surface 40*d* of the driven roller 40.

A downstream end of the guide portion 74 is located, in the transport direction, downstream of the contact surface 52*b* located at the contact position PC. Therefore, when the gate portion 50 is in the advance state, it is visible that the contact surface 52*b* of the contact portion 52*a* of the gate portion 50 and the guide portion 74 partially overlap each other when viewed in the direction along the Y-axis. In other words, when the gate portion 50 is in the advance state, the contact surface 52*b* of the contact portion 52*a* of the gate portion 50 and the guide portion 74 overlap each other when viewed in the direction along the Y-axis. Therefore, when the gate portion 50 is in the advance state, the guide portion 74 guides the tip Pef of the transported medium P to the contact surface 52*b* located at the contact position PC. The direction along the Y-axis is an example of the direction along the rotary shaft 39*a* of the driving roller 39.

On the other hand, the downstream end of the guide portion 74 is located upstream of the pinching position PN in the transport direction. Therefore, in the curved path T0, the guide portion 74 does not exist from the downstream end of the guide portion 74 in the transport direction to the pinching position PN. However, a direction in which the guide portion 74 guides the medium P is set to a direction in which the tip Pef of the transported medium P faces the driven roller 40. Therefore, even until the tip Pef of the medium P transported while being guided by the guide portion 74 in the tip Pef of the medium P transported toward the pinching position PN reaches the pinching position PN after passing through the downstream end of the guide portion 74, the tip Pef of the medium P is less likely to come into contact with the driving roller 39.

The guide portion 74 in the present embodiment has an upstream guide portion 75 and a downstream guide portion 76 continuous with the upstream guide portion 75 located downstream in the transport direction. Together with the facing second guide portion 82 and the peripheral surface 40*d* of the driven roller 40, the upstream guide portion 75 and the downstream guide portion 76 are inclined to form a transport passage tapered from the upstream portion to the downstream portion in the transport direction when viewed in the direction along the Y-axis direction. The transport passage forms a portion of the curved path T0. A degree of inclination of the downstream guide portion 76 in the present embodiment is set to be smaller than a degree of inclination of the upstream guide portion 75. As a result, a direction in which the downstream guide portion 76 extends toward the driven roller 40 is closer to the pinching position PN than is a direction in which the upstream guide portion 75 extends toward the driven roller 40.

In addition, as illustrated in FIGS. 10 to 12, subsequently to the skew correction operation, as illustrated by a white arrow in FIG. 11, the gate portion 50 rotates around the axis center of the rotary shaft 39*a* in the clockwise direction when viewed in the −Y-direction from the side in the +Y-direction. In this manner, the gate portion 50 is switched from the advance state to the retreat state. In this process, the tip of the contact portion 52*a* of the gate portion 50 moves from a position where it is visible that the tip of the contact portion 52*a* overlaps the peripheral surface 40*d* of the driven roller 40 when viewed in the direction along the Y-axis to a position where the tip of the contact portion 52*a* separated from the driven roller 40 while widening an interval from the peripheral surface 40*d* of the driven roller 40.

In addition, subsequently to the skew correction operation, the contact surface 52*b* of the contact portion 52*a* rotates around the axis center of the rotary shaft 39*a* in the clockwise direction when viewed in the −Y-direction from the side in the +Y-direction. In this manner, the contact surface 52*b* of the contact portion 52*a* reaches the pinching position PN of the transport roller pair 38 from the contact position PC. Until the contact surface 52*b* of the contact portion 52*a* reaches the pinching position PN from the contact position PC, as illustrated in FIG. 11, the contact surface 52*b* of the contact portion 52*a* located at the contact position PC moves toward the retreat position PE from a position where the contact surface 52*b* of the contact portion 52*a* is along the depth direction DF of the transport path T when viewed in the direction along the Y-axis, while increasing the inclination degree of the contact surface 52*b* of the contact portion 52*a*.

Therefore, in a process of switching the gate portion 50 from the advance state to the retreat state, until the contact surface 52*b* of the contact portion 52*a* reaches the pinching position PN of the transport roller pair 38 from the contact position PC, the tip Pef of the medium P in contact with the contact surface 52*b* is likely to move toward the driven roller 40 on the contact surface 52*b*. Therefore, the tip Pef of the medium P is unlikely to come into contact with the driving roller 39 until the tip Pef of the medium P reaches the pinching position PN from a position where the tip Pef of the medium P is in contact with the contact surface 52*b*.

Figure 13:
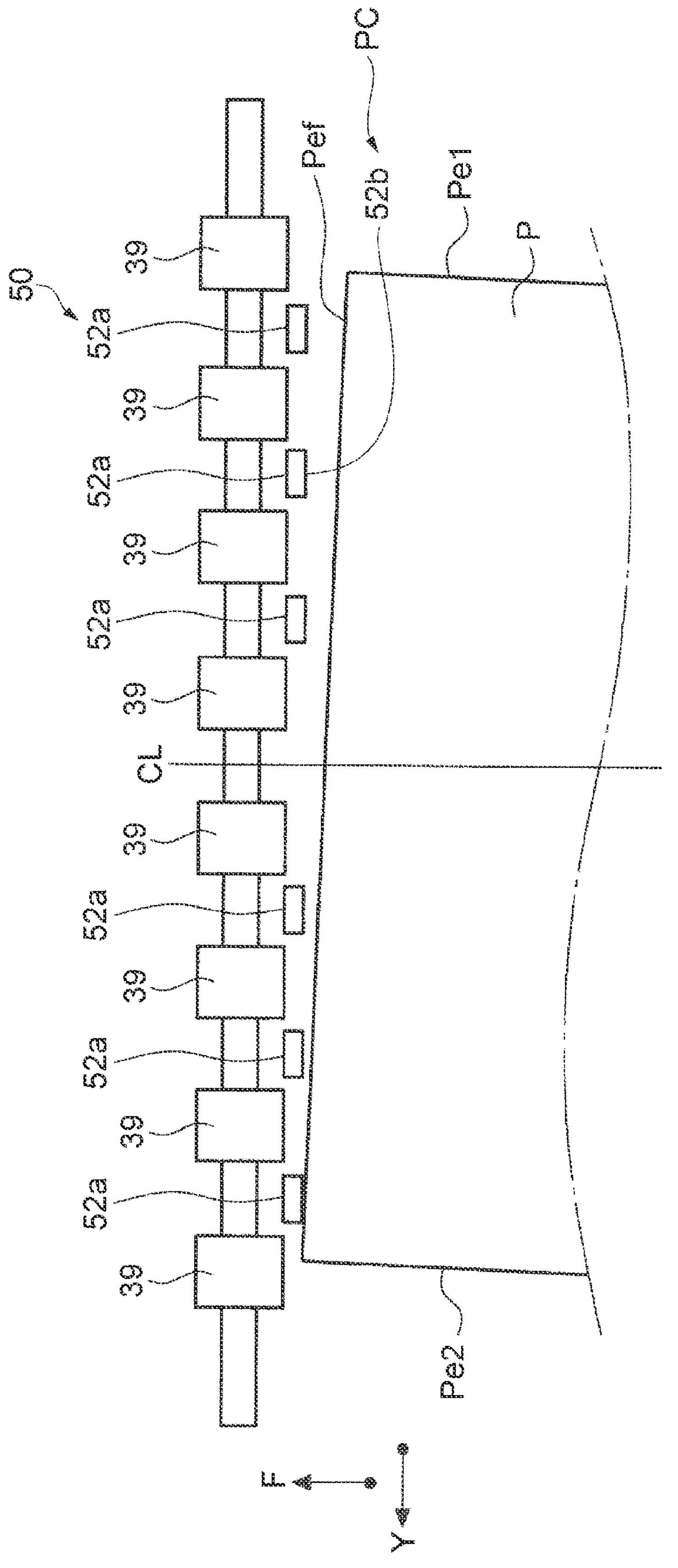
FIG. 13 is a plan view of a medium in a state where a tip of the medium is in contact with the gate portion.
Figure 14:
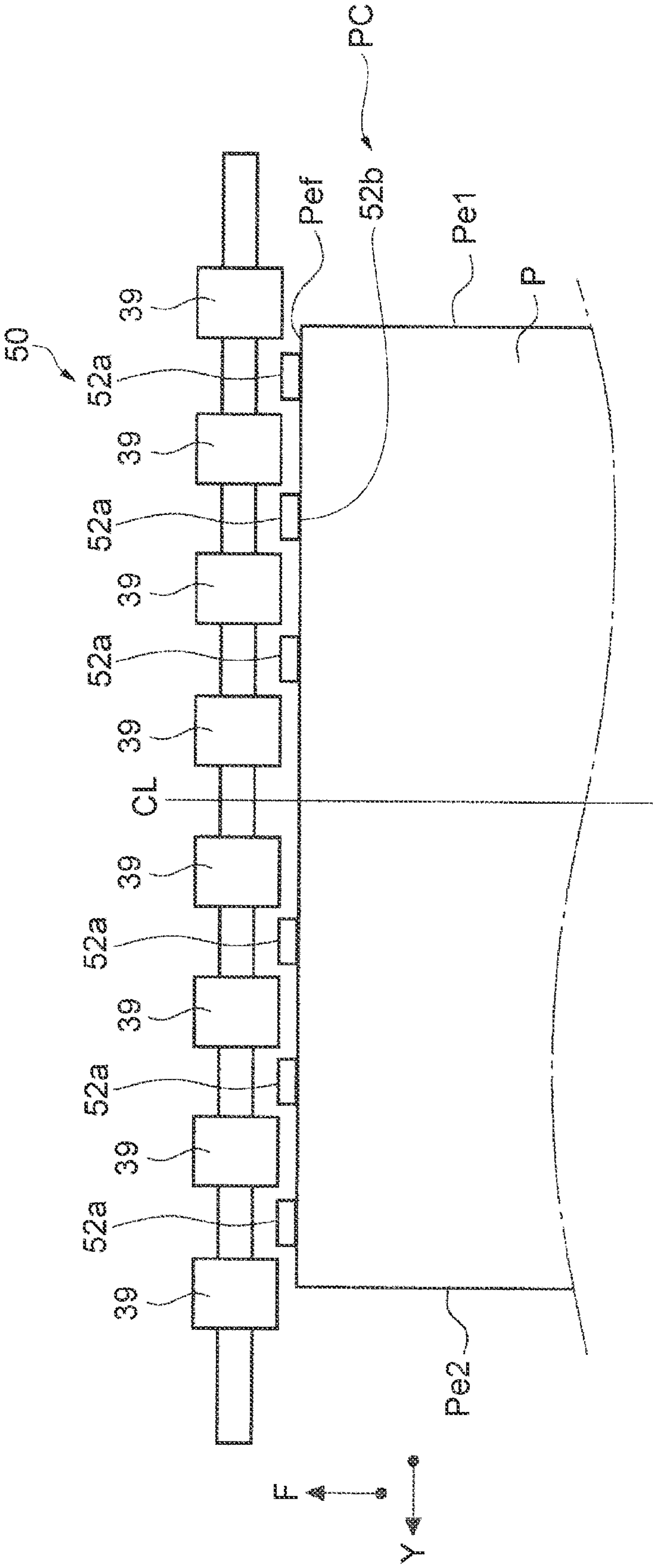
FIG. 14 is a plan view of a medium in which skew is corrected.

Next, the skew correction operation and an operation subsequent to the skew correction operation will be described with reference to FIGS. 9 to 14. FIGS. 13 and 14 are plan views of the medium P in a state where the tip Pef is in contact with the contact surface 52*b* of the contact portion 52*a*. In FIGS. 13 and 14, the medium P is transported in the upward direction.

As illustrated in FIG. 9, in the advance state of the gate portion 50 in which the contact surface 52*b* of the contact portion 52*a* is located at the contact position PC, the control unit 90 drives the driving roller 36 of the transport roller pair 35 so that the medium P transported to the curved path T0 from the upstream portion in the transport direction is transported toward the transport roller pair 38. Alternatively, in the advance state of the gate portion 50 in which the contact surface 52*b* of the contact portion 52*a* is located at the contact position PC, the control unit 90 drives and controls the delivery roller pair 25 so that the medium P transported from the first medium cassette 3 is transported toward the transport roller pair 38 via the delivery path T4 and the curved path T0. The medium P transported from the first medium cassette 3 to the curved path T0 via the delivery path T4 is guided by the rib 73 of the first guide portion 71 and the guide portion 74 in the curved path T0, and is transported toward the transport roller pair 38. In other words, the medium P transported from the first medium cassette 3 to the transport roller pair 38 via the delivery path T4 and the curved path T0 is transported along the first guide portion 71 in the curved path T0.

In this manner, as illustrated in FIGS. 10 and 13, the tip Pef of the medium P transported toward the transport roller pair 38 comes into contact with the contact surface 52*b* of the contact portion 52*a*. As illustrated in FIG. 13, in a state where the tip Pef reaches the gate portion 50 when the medium P is skewed, the medium P does not bulge between the outer path forming surface 65*a* and the inner path forming surface 67*a* and, a side edge Pe2 that is transported earlier due to the skew than is another side edge Pe1 and the side edge Pe1, which is transported later than is the side edge Pe2 due to the skew, are located at substantially the same positions between the outer path forming surface 65*a* and the inner path forming surface 67*a*.

As illustrated in FIG. 13, in a state where the tip Pef is in contact with the contact surface 52*b* of the contact portion 52*a*, the control unit 90 continues to drive the driving roller 36 or continues to drive the delivery roller pair 25. Accordingly, the medium P bulges in the curved path T0. In this manner, as illustrated in FIG. 14, the tip Pef rotates to follow the contact surface 52*b* of the contact portion 52*a*, and the skew is corrected.

Subsequently to the skew correction operation, the control unit 90 drives the solenoid 58 to switch the gate portion 50 from the advance state to the retreat state. In a process of switching the gate portion 50 from the advance state illustrated in FIG. 10 to the retreat state illustrated in FIG. 12 via a state illustrated in FIG. 11, when the contact surface 52*b* of the contact portion 52*a* moves downstream in the transport direction from the pinching position PN of the transport roller pair 38, the tip Pef of the medium P comes into contact with the pinching position PN. When a predetermined time elapses after the medium detection unit 48 detects the medium P, the control unit 90 drives the solenoid 58 to switch the gate portion 50 from the advance state to the retreat state.

When the contact surface 52*b* of the contact portion 52*a* moves to the retreat position PE illustrated in FIG. 12 and the gate portion 50 is in the retreat state, the control unit 90 drives the driving roller 39 of the transport roller pair 38. In this manner, as illustrated in FIG. 12, the medium P is transported downstream in the transport direction, and the tip Pef of the medium P enters the recording-time transport path T1 after passing through the pinching position PN.

As described above, according to the printer 1 in Embodiment 1, the following advantageous effects can be obtained.

The printer 1 has the line head 46 that performs recording on the medium P, the curved path T0 through which the medium P is transported toward the line head 46, and the transport roller pair 38 having the driving roller 39 and the driven roller 40 which are provided in the curved path T0, the transport roller pair 38 pinching the medium P by the driving roller 39 and the driven roller 40 and transporting the medium P toward the line head 46. In addition, when the direction in which the medium P is transported is defined as the transport direction and the position where the transport roller pair 38 pinches the medium P is defined as the pinching position PN, the printer 1 includes the gate portion 50 having the contact surface 52*b*, the gate portion 50 being configured to switch between the advance state where the contact surface 52*b* is located at the contact position PC located upstream of the pinching position PN in the transport direction and comes into contact with the tip Pef of the transported medium P, and the retreat state where the contact surface 52*b* retreats from the contact position PC. In addition, the printer 1 includes the guide portion 74 forming the curved path T0 and guiding the tip Pef of the transported medium P to the contact surface 52*b* located at the contact position PC, the guide portion 74 protruding further in the radial direction of the driving roller 39 than does the peripheral surface 39*d* of the driving roller 39 when viewed in the direction along the Y-axis. According to this configuration, when the peripheral surfaces of the peripheral surface 39*d* of the driving roller 39 and the peripheral surface 40*d* of the driven roller 40 located upstream of the contact position PC in the transport direction are defined as the upstream peripheral surfaces, compared to the related art, the tip Pef of the medium P is prevented from coming into contact with the upstream peripheral surfaces before reaching the contact position PC. Accordingly, it is possible to prevent accuracy in correcting the skew of the medium P from reducing. Therefore, it is possible to prevent quality of an image formed on the medium P may from degrading due to the skew correction operation of the medium P.

In the printer 1, the driving roller 39 is the toothed roller having the plurality of teeth 39*c* which can come into point contact with the medium P, in which the plurality of teeth 39*c* form the peripheral surface 39*d*. According to this configuration, the driving roller 39 can be suitably adopted as the first roller forming the transport roller pair 38.

The printer 1 has the line head 46 that performs recording on the medium P, the curved path T0 through which the medium P is transported toward the line head 46, and the transport roller pair 38 having the driving roller 39 and the driven roller 40 which are provided in the curved path T0, the transport roller pair 38 pinching the medium P by the driving roller 39 and the driven roller 40 and transporting the medium P toward the line head 46. In addition, when the direction in which the medium P is transported is defined as the transport direction and the position where the transport roller pair 38 pinches the medium P is defined as the pinching position PN, the printer 1 includes the gate portion 50 having the contact surface 52*b*, the gate portion 50 being configured to switch between the advance state where the contact surface 52*b* is located at the contact position PC located upstream of the pinching position PN in the transport direction in the curved path T0 and comes into contact with the tip Pef of the transported medium P, and the retreat state where the contact surface 52*b* retreats from the contact position PC. In the curved path T0, the medium P is transported in a state in which first surface of the medium P recorded by the line head 46 comes into contact with the peripheral surface 39*d* of the driving roller 39. The driving roller 39 is the toothed roller having the plurality of teeth 39*c* which can come into point contact with the medium P, and the plurality of teeth 39*c* form the peripheral surface 39*d* around the axis center of the rotary shaft 39*a* of the driving roller 39. According to this configuration, the driving roller 39 is used as the toothed roller. In this manner, it is possible to prevent the ink adhering to the medium P from being transferred to the driving roller 39, or the ink transferred to the driving roller 39 from being transferred to the driven roller 40. It is possible to prevent quality of an image formed on the medium P from degrading because the ink transferred to any one of the driving roller 39 and the driven roller 40 is prevented from transferring to the medium P and the subsequently transported medium P. Therefore, it is possible to prevent quality of an image formed on the medium P from degrading due to the skew correction operation of the medium P.

The printer 1 includes the guide portion 74 forming the curved path T0 and guiding the tip Pef of the transported medium P to the contact surface 52*b* located at the contact position PC, the guide portion 74 protruding further in the radial direction of the driving roller 39 than does the peripheral surface 39*d* of the driving roller 39, when viewed in the direction along the Y-axis. According to this configuration, when the peripheral surfaces of the peripheral surface 39*d* of the driving roller 39 and the peripheral surface 40*d* of the driven roller 40 located upstream of the contact position PC in the transport direction are defined as the upstream peripheral surfaces, compared to the related art, the tip Pef of the medium P is prevented from coming into contact with the upstream peripheral surfaces before reaching the contact position PC. Accordingly, it is possible to prevent accuracy in correcting the skew of the medium P from reducing. Therefore, it is possible to prevent quality of an image formed on the medium P may from degrading due to the skew correction operation of the medium P.

In the printer 1, the peripheral surface 40*d* of the driven roller 40 is formed of an elastic member, and a direction in which the guide portion 74 guides the medium P is a direction in which the tip Pef of the transported medium P is transported toward the driven roller 40. According to this configuration, the medium P is guided toward the driven roller 40. Therefore, until the medium P reaches the pinching position PN, the medium P is likely to come into contact with the driven roller 40 of the transport roller pair 38 and it is possible to prevent the medium P from coming into contact with the driving roller 39.

In the printer 1, when the gate portion 50 is in the advance state, the contact surface 52*b* and the guide portion 74 overlap each other when viewed in the direction along the Y-axis direction. According to this configuration, when the gate portion 50 is in the advance state, the contact surface 52*b* and the guide portion 74 overlap each other when viewed in the direction along the Y-axis direction. Therefore, it is possible to more reliably prevent the tip Pef of the medium P from coming into contact with the driving roller 39.

In the printer 1, a plurality of the guide portions 74 are provided to sandwich the contact surface 52*b* of the gate portion 50 in the Y-axis direction. In particular, the guide portion 74 is interposed between two contact surfaces 52*b*, which are located on either side of the guide portion 74 in the Y-axis direction. According to this configuration, the guide portion 74 can stably guide the medium P to the contact surface 52*b* of the contact portion 52*a* located at the contact position PC.

The printer 1 includes the rib 73 that is provided in the curved path T0 and coming into contact with the transported medium P, and the guide portion 74 is provided at a position corresponding to the rib 73. According to this configuration, the guide portion 74 is provided at the position corresponding to the rib 73. Therefore, the tip of the medium can be stably guided, compared to a configuration in which the guide portion 74 is provided alone.

In the printer 1, when the gate portion 50 is in the retreat state, the contact surface of the gate portion 50 is located at a position farther separated from the curved path T0 than is the rib 73. According to this configuration, when the gate portion 50 is in the retreat state, the gate portion 50 does not come into contact with the medium P. Therefore, it is possible to prevent a transport load from being applied to the medium P.

In the printer 1, the gate portion 50 is provided to be rotatable around the rotary shaft 39*a* of the driving roller 39. According to this configuration, this configuration can be suitably adopted as a configuration for switching the gate portion 50 between the advance state and the retreat state.

The printer 1 according to the above-described embodiment of the present disclosure basically has the configurations as described above. However, as a matter of course, the configurations may be partially changed or omitted within the scope not departing from the concept of the present disclosure. In addition, the above-described embodiment and other embodiments described below can be implemented in combination with each other within the scope in which the embodiments are not technically inconsistent with each other. Hereinafter, other embodiments will be described.

Figure 15:
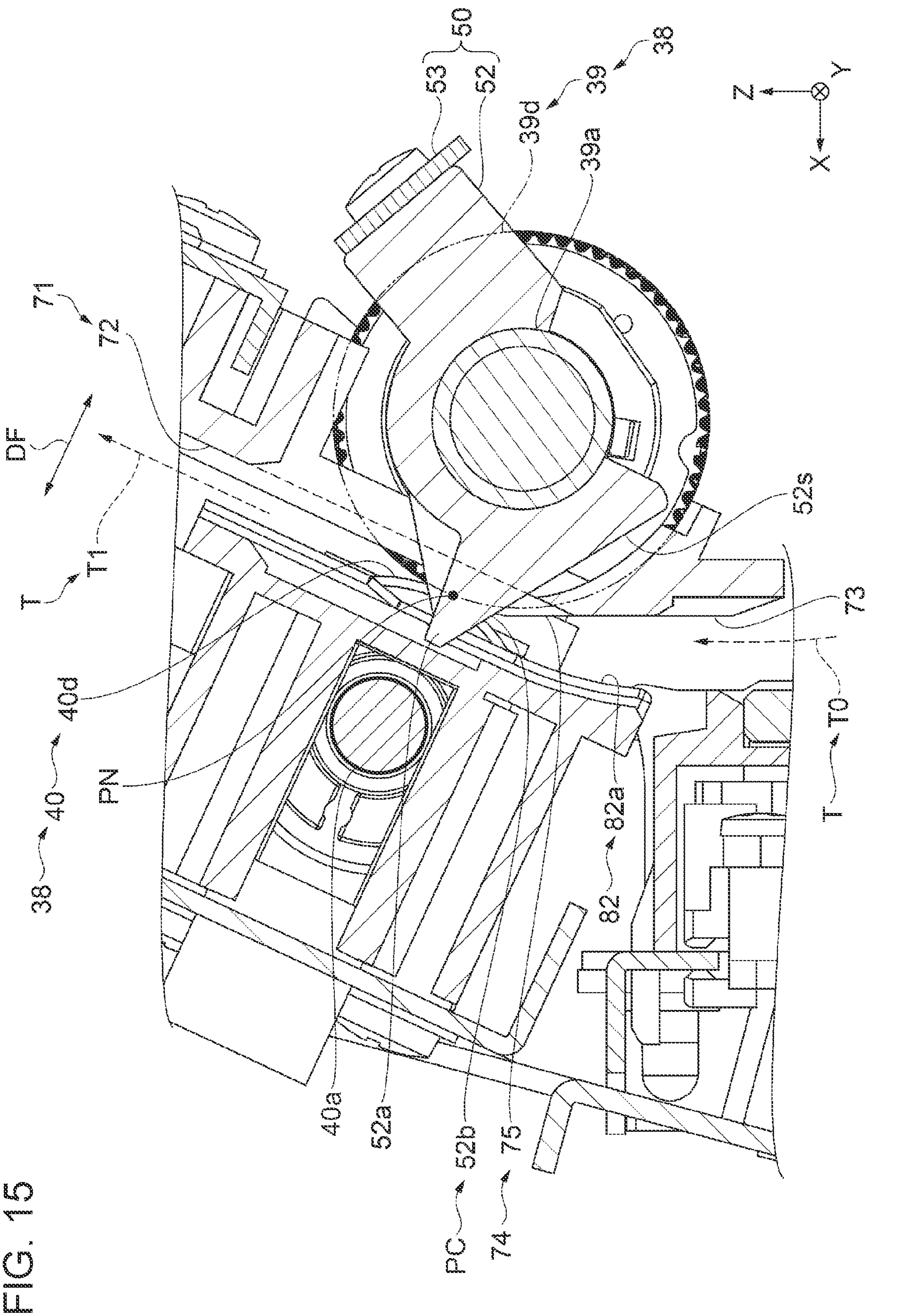
FIG. 15 is a sectional view illustrating a main portion of a curved path in which a gate portion according to another embodiment is in an advance state.
Figure 16:
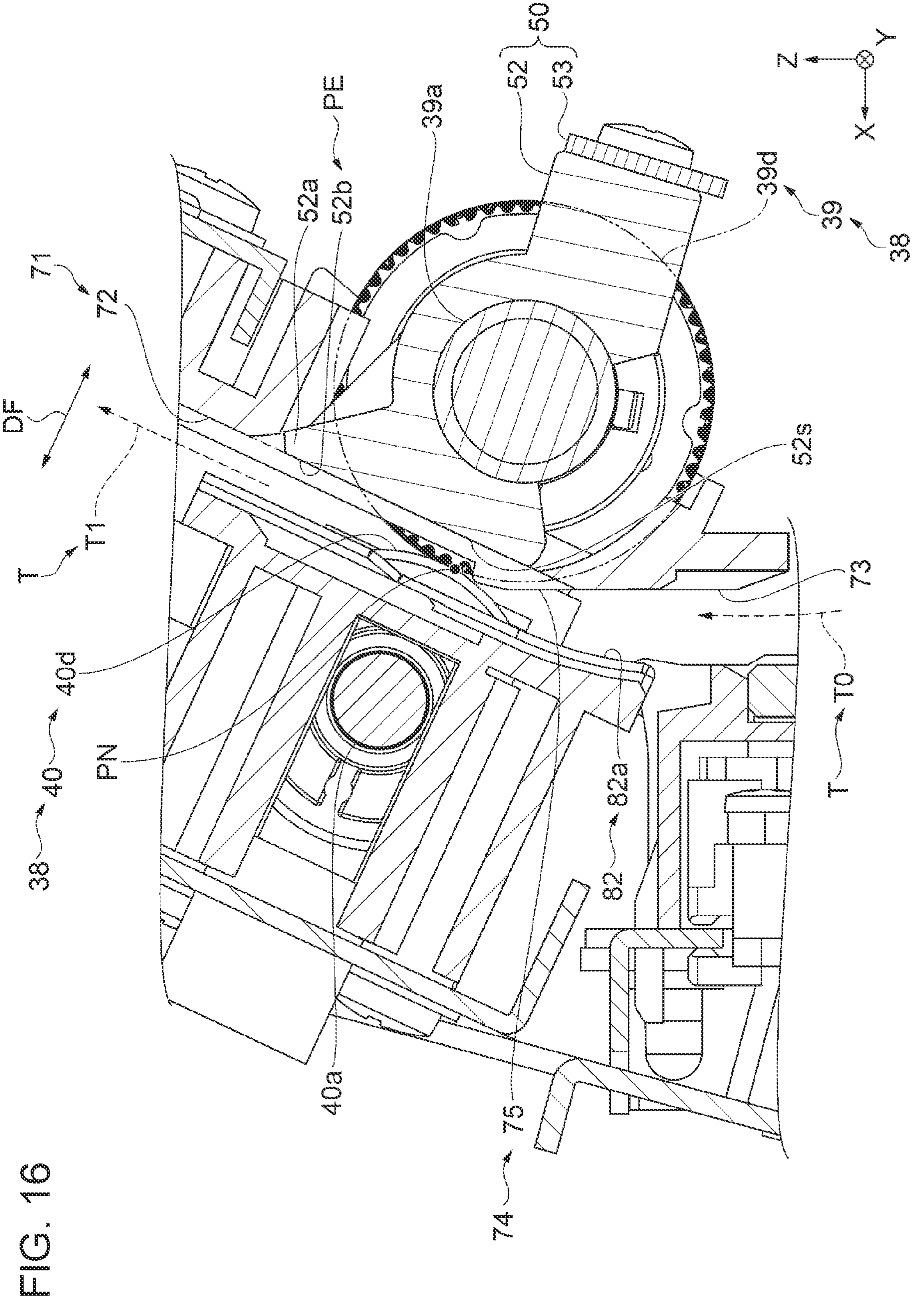
FIG. 16 is a sectional view illustrating a main portion of a curved path in which a gate portion according to another embodiment is in a retreat state.

In the above-described embodiment, the moving member 52 of the gate portion 50 may have a support portion 52*s* that can support the medium P when the gate portion 50 is in the retreat state. For example, as illustrated in FIGS. 15 and 16, the support portion 52*s* of the moving member 52 is a flat surface provided to be continuous with the contact surface 52*b* of the contact portion 52*a*. In this case, the contact surface 52*b* and the support portion 52*s* may be provided to form the same plane. In addition, in this case, as illustrated in FIG. 16, when the gate portion 50 is in the retreat state, the contact surface 52*b* and the support portion 52*s* may be provided to be located at the same position as the position of the base surface 72 of the first guide portion 71 in the depth direction DF of the transport path T. In addition, in this case, as illustrated in FIG. 15, when the gate portion 50 is in the advance state, the contact surface 52*b* located at the contact position PC may be inclined toward downstream in the transport direction such as one edge of the contact surface 52*b* is located downstream of the another edge of the contact surface 52*b* in the transport direction, the one edge being an edge located closer to the driven roller than is the another edge, when viewed in the direction along the Y-axis direction.

Figure 17:
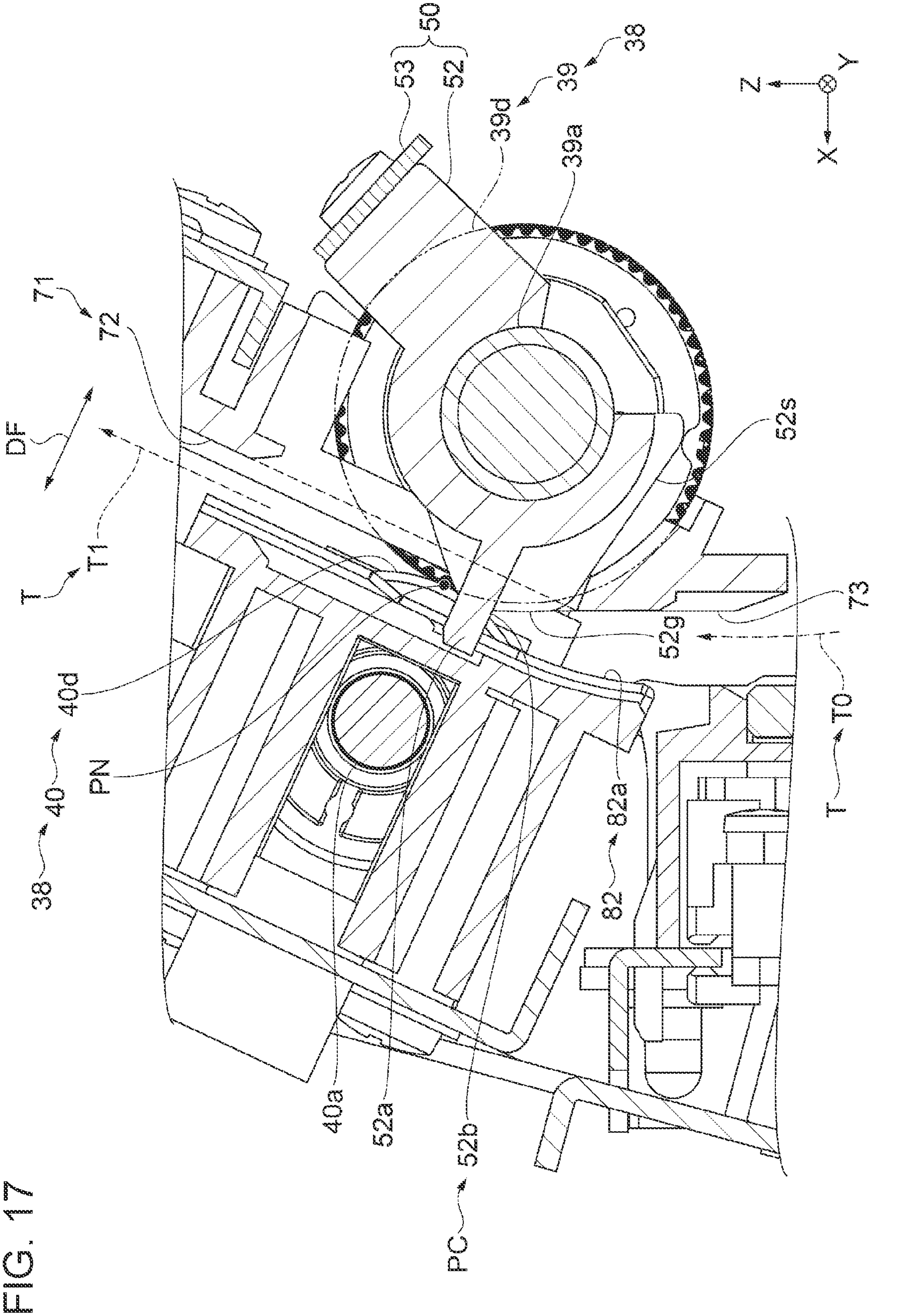
FIG. 17 is a sectional view illustrating a main portion of a curved path in which a gate portion according to another embodiment is in an advance state.
Figure 18:
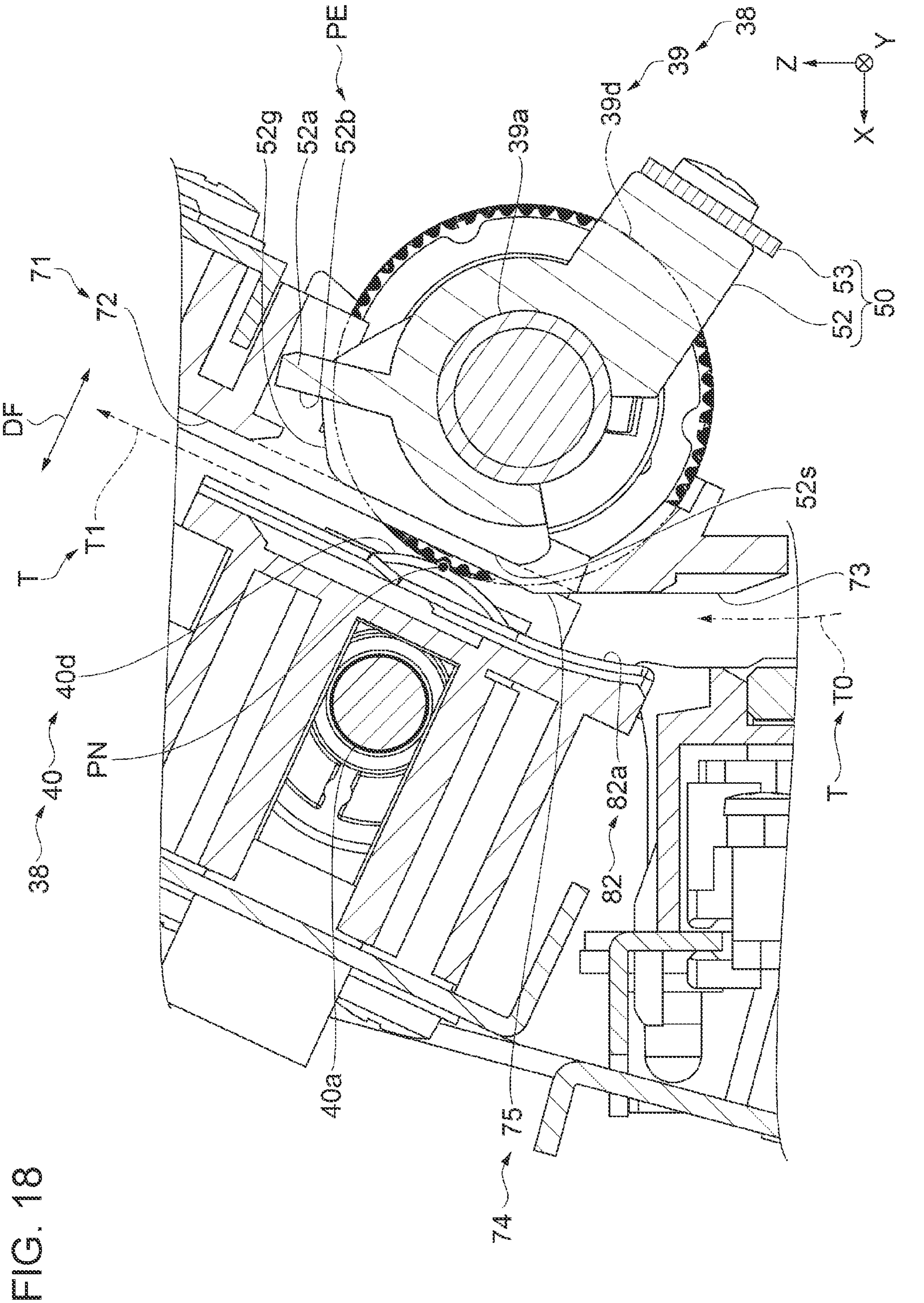
FIG. 18 is a sectional view illustrating a main portion of a curved path in which a gate portion according to another embodiment is in a retreat state.

In the above-described embodiment, the moving member 52 of the gate portion 50 may have a guide portion 52*g* that guides the tip Pef of the transported medium P to the contact surface 52*b* when the gate portion 50 is in the advance state. The guide portion 52*g* has the same function as that of the guide portion 74 of the first guide portion 71 in Embodiment 1. In this case, the first guide portion 71 may not include the guide portion 74. For example, as illustrated in FIG. 17, when the gate portion 50 is in the advance state, the guide portion 52*g* may have the same shape as that of the guide portion 74 in Embodiment 1 when viewed in the direction along the Y-axis direction. In addition, the moving member 52 may have the support portion 52*s* that can support the medium P. The support portion 52*s* is provided to be continuous with the guide portion 52*g*. In this case, as illustrated in FIG. 18, when the gate portion 50 is in the retreat state, the support portion 52*s* may be provided so that a position where the support portion 52*s* supports the medium P is the same position as that of the base surface 72 of the first guide portion 71 in the depth direction DF of the transport path T. In addition, in this case, when the gate portion 50 is in the retreat state, the guide portion 52*g* and the support portion 52*s* may have a rib shape extending in the transport direction. In addition, in this case, a plurality of the guide portions 52*g* and a plurality of the support portions 52*s* may be provided in the moving member 52 at an interval in the Y-axis direction.

In the above-described embodiment, the guide portion 74 of the first guide portion 71 may not be formed integrally with the rib 73. For example, as a separate member, the guide portion 74 may be attached to the rib 73 to be located at the same position as that of the guide portion 74 in Embodiment 1. Alternatively, as a separate member, the guide portion 74 may be attached to the first guide portion 71 at a different position from that of the rib 73 in Embodiment 1 in the Y-axis direction. In addition, alternatively, as a separate member, the guide portion 74 may be provided to be movable with respect to the first guide portion 71. In this case, when the gate portion 50 is in the advance state, the guide portion 74 is located at a guide position which is the same position as that of the guide portion 74 of Embodiment 1 when viewed in the direction along the Y-axis. When the gate portion 50 is in the retreat state, the guide portion 74 may move to be located at a retreat position which does not protrude from the rib 73. In addition, in this case, a cam surface for supporting a protrusion provided in the guide portion 74 may be provided in the moving member 52, and the cam surface may be displaced as the gate portion 50 is switched between the advance state and the retreat state. In this manner, the guide portion 74 may be moved to the guide position and the retreat position.

In the above-described embodiment, the moving member 52 of the gate portion 50 may not be provided to be rotatable around the rotary shaft 39*a* of the driving roller 39. For example, the moving member 52 may be provided to be rotatable around a rotary shaft different from the rotary shaft 39*a* of the driving roller 39. When the rotary shaft is defined as a rotary shaft RS (not illustrated), for example, the axis center of the rotary shaft RS is along the Y-axis. When viewed in the direction along the Y-axis as in FIG. 10, the axis center of the rotary shaft RS is provided on the first guide portion 71 side with respect to the transport path T in the depth direction DF of the transport path T, at a position farther separated from the transport path T than the inner surface of the transport path T formed by the rib 73 of the first guide portion. In addition, when viewed in the direction along the Y-axis, the axis center of the rotary shaft RS is provided at a position upstream of the peripheral surface 39*d* of the driving roller 39 in the transport direction. In this case, the contact surface 52*b* of the contact portion 52*a* may move to the contact position PC in Embodiment 1 and a separation position in which the contact surface 52*b* is closer to the driving roller 39 than the contact surface 52*b* in the contact position PC in the depth direction DF of the transport path T. When the separation position is defined as a separation position PSA (not illustrated), the separation position PSA is located upstream of the pinching position PN in the transport direction. In addition, when viewed in the direction along the Y-axis, in a process of switching the gate portion 50 from the advance state to the retreat state, a gap through which the medium P can pass is formed between the tip of the contact portion 52*a* and the driven roller 40. When the gap is defined as a gap GA (not illustrated), the contact portion 52*a* forms a transport passage forming a portion of the curved path T0 together with the peripheral surface 40*d* of the driven roller 40 when the gap GA is formed. The transport passage has a shape tapered from the upstream portion to the downstream portion in the transport direction when viewed in the direction along the Y-axis. In addition, the contact portion 52*a* rotates around the axis center of the rotary shaft RS. Therefore, until the gap GA is formed, the contact surface 52*b* of the contact portion 52*a* is inclined toward downstream in the transport direction such as one edge of the contact surface 52*b* is located downstream of the another edge of the contact surface 52*b* in the transport direction, the one edge being an edge located closer to the driven roller than is the another edge, when viewed in the direction along the Y-axis. Therefore, until the gap GA is formed, the tip Pef of the medium P in contact with the contact surface 52*b* is likely to move to the one edge of the contact surface 52*b*. Therefore, the tip Pef of the medium P passing through the gap GA and moving toward the pinching position PN from a state of being in contact with the contact surface 52*b* is unlikely to come into contact with the driving roller 39.

In the above-described embodiment, the moving member 52 of the gate portion 50 may not be provided to be rotatable around the rotary shaft 39*a* of the driving roller 39. For example, the moving member 52 may be provided in the first guide portion 71 to be slidable in a direction along the depth direction DF of the transport path T. In this case, the contact surface 52*b* of the contact portion 52*a* provided in the moving member 52 may move to the contact position PC in Embodiment 1 and the separation position which does not come into contact with the transported medium P. When the separation position is defined as a separation position PSB (not illustrated), the separation position PSB is located on the rotary shaft 39*a* side of the driving roller 39 from the contact position PC in the depth direction DF of the transport path T when viewed in the direction along the Y-axis as in FIG. 10. In addition, the contact surface 52*b* located at the separation position PSB is along the depth direction DF of the transport path T. In addition, in this case, the separation position PSB is located at the same position as the contact position PC in the transport direction, and is located upstream of the pinching position PN in the transport direction. In addition, in this case, in a process of switching the gate portion 50 from the advance state to the retreat state, a gap GB (not illustrated) through which the medium P can pass is formed between the tip of the contact portion 52*a* and the peripheral surface 40*d* of the driven roller 40. The tip Pef of the medium P passing through the gap GB and moving toward the pinching position PN from a state of being in contact with the contact surface 52*b* is unlikely to come into contact with the driving roller 39.

In the above-described embodiment, the printer 1 may not include the switching unit 57 which switches the gate portion 50 between the advance state and the retreat state and the solenoid 58. For example, in Embodiment 1, a pressing force of a spring acting on the coupling member 53 may be changed so that the gate portion 50 is in the advance state. In this case, in FIG. 10, when the tip Pef of the transported medium P comes into contact with the contact surface 52*b* at the contact position PC and the pressing force for pressing the contact surface 52*b* has a predetermined magnitude, the moving member 52 rotates in the clockwise direction. In this manner, the pressing force of the spring acting on the coupling member 53 may be set so that the medium P can pass through a gap GC (not illustrated) formed between the contact portion 52*a* and the driven roller 40.

In the above-described embodiment, the control unit 90 may drive the driving roller 39 performed subsequently to the skew correction operation before the gate portion 50 is in the retreat state. For example, the control unit 90 may start driving the driving roller 39 at the same time as driving the solenoid 58 for switching the gate portion 50 from the advance state to the retreat state. In addition, for example, the control unit 90 may start driving the driving roller 39 while the moving member 52 moves in a process of switching the gate portion 50 from the advance state to the retreat state. In this case, the control unit 90 may start driving the driving roller 39 after the contact surface 52*b* of the contact portion 52*a* passes through the pinching position PN.

In the above-described embodiment, the transport path T may be provided with a heater for drying the ink adhering to the first surface of the medium P before the medium P whose first surface is recorded by the line head 46 reaches the transport roller pair 38. In this case, for example, the heater may be provided in the switchback path T2 or the inversion path T3. Alternatively, the medium P whose first surface is recorded may be held in the switchback path T2 or the inversion path T3 for a predetermined time. In this manner, the ink adhering to the first surface of the medium P may be dried before the medium P reaches the transport roller pair 38. When there is a probability that the ink adhering to the medium P may be transferred to the driving roller 39 forming the transport roller pair 38, the driving roller 39 may not be the toothed roller. In this case, the driving roller 39 may be a metal roller processed so that a portion of the peripheral surface 39*d* has a rough surface, or a so-called non-slip roller. In addition, in this case, the driving roller 39 may be a ceramic roller in which a plurality of ceramic particles are provided on the peripheral surface 39*d*.

What is claimed is:

1. A recording device comprising:

a recording unit that performs recording on a medium;

a transport path through which the medium is transported toward the recording unit;

a transport roller pair having a first roller and a second roller which are provided in the transport path, pinching the medium by the first roller and the second roller at a pinching position, and transporting the medium toward the recording unit in a transport direction;

a gate portion that has a contact surface and is configured to switch between an advance state in which the contact surface is located at a contact position located upstream of the pinching position in the transport direction in the transport path and comes into contact with a tip of the medium, and a retreat state in which the contact surface retreats from the contact position; and a guide portion that guides the tip of the transported medium to the contact surface located at the contact position, the guide portion protruding further in a radial direction of the first roller than does an outer periphery of the first roller when viewed in a direction along a rotary shaft of the first roller, wherein the guide portion is separate from the gate portion and defines the at least a portion of the transport path.

2. The recording device according to claim 1, wherein the first roller is a toothed roller having a plurality of teeth configured to come into point contact with the medium.

3. The recording device according to claim 2, wherein an outer peripheral surface of the second roller is formed of an elastic member, and a direction in which the guide portion guides the medium is a direction in which the tip of the medium is transported toward the second roller.

4. The recording device according to claim 2, wherein when the gate portion is in the advance state, the contact surface overlaps the guide portion when viewed in the direction along the rotary shaft of the first roller.

5. The recording device according to claim 2, wherein the gate portion has a second contact surface and the guide portion is interposed between the contact surface and the second contact surface which are located either side of the guide portion in the direction along the rotary shaft of the first roller.

6. The recording device according to claim 2, further comprising:

a rib that is provided in the transport path and comes into contact with the transported medium, wherein the guide portion is provided at a position corresponding to the rib in the transport direction.

7. The recording device according to claim 2, wherein the gate portion is provided to be rotatable around the rotary shaft of the first roller.

8. The recording device according to claim 1, wherein an outer peripheral surface of the second roller is formed of an elastic member, and a direction in which the guide portion guides the medium is a direction in which the tip of the medium is transported toward the second roller.

9. The recording device according to claim 1, wherein when the gate portion is in the advance state, the contact surface overlaps the guide portion when viewed in the direction along the rotary shaft of the first roller.

10. The recording device according to claim 1, wherein the gate portion has a second contact surface and the guide portion is interposed between the contact surface and the second contact surface which are located either side of the guide portion in the direction along the rotary shaft of the first roller.

11. The recording device according to claim 1, further comprising:

a rib that is provided in the transport path and comes into contact with the transported medium, wherein the guide portion is provided at a position corresponding to the rib in the transport direction.

12. The recording device according to claim 11, wherein when the gate portion is in the retreat state, the contact surface of the gate portion is located farther separated from the transport path than is the rib.

13. The recording device according to claim 1, wherein the gate portion is provided to be rotatable around the rotary shaft of the first roller.

14. A recording device comprising:

a recording unit that performs recording on a medium;

a transport path through which the medium is transported toward the recording unit;

a transport roller pair having a first roller and a second roller which are provided in the transport path, pinching the medium by the first roller and the second roller at a pinching position, and transporting the medium toward the recording unit in a transport direction;

a gate portion that has a contact surface and is configured to switch between an advance state in which the contact surface is located at a contact position located upstream of the pinching position in the transport direction in the transport path and comes into contact with a tip of the transported medium, and a retreat state in which the contact surface retreats from the contact position; and a guide portion that guides the tip of the transported medium to the contact surface located at the contact position, wherein the transport roller pair is configured to transport the medium in a state in which a first surface recorded by the recording unit comes into contact with the first roller, the first roller is a toothed roller having a plurality of teeth configured to come into point contact with the medium, and wherein the guide portion is separate from the gate portion and defines the at least a portion of the transport path.

15. The recording device according to claim 14, wherein the guide portion protrudes further in a radial direction of the first roller than does an outer periphery of the first roller when viewed in a direction along a rotary shaft of the first roller.

* * * * *